(12) United States Patent
Mori et al.

(10) Patent No.: US 8,352,989 B2
(45) Date of Patent: Jan. 8, 2013

(54) CONTENT TRANSMISSION DEVICE AND CONTENT REPRODUCTION DEVICE

(75) Inventors: Toshiaki Mori, Mino (JP); Yuji Kaihotsu, Yokohama (JP); Akihiro Yamamoto, Osaka (JP); Takashi Kuwabara, Yokohama (JP); Manabu Nakakita, Moriguchi (JP)

(73) Assignee: Panasonic Corporation, Osaka (JP)

( * ) Notice: Subject to any disclaimer, the term of this patent is extended or adjusted under 35 U.S.C. 154(b) by 478 days.

(21) Appl. No.: 10/576,586

(22) PCT Filed: Feb. 14, 2005

(86) PCT No.: PCT/JP2005/002180

§ 371 (c)(1),
(2), (4) Date: Apr. 20, 2006

(87) PCT Pub. No.: WO2005/101698

PCT Pub. Date: Oct. 27, 2005

(65) Prior Publication Data

US 2007/0032975 A1 Feb. 8, 2007

(30) Foreign Application Priority Data

Mar. 31, 2004 (JP) ................................. 2004-105856

(51) Int. Cl.
- *H04N 7/18* (2006.01)
- *H04N 7/16* (2006.01)
- *H04N 7/173* (2006.01)
- *H04W 4/00* (2009.01)

(52) U.S. Cl. ............... 725/75; 725/62; 725/98; 725/134; 725/142; 725/148; 725/114; 725/116; 370/338

(58) Field of Classification Search .................... 725/59, 725/75, 98, 119, 134, 142, 148, 62, 114, 725/116; 455/450–453; 370/338

See application file for complete search history.

(56) References Cited

U.S. PATENT DOCUMENTS

| | | | | | |
|---|---|---|---|---|---|
| 5,737,363 | A | * | 4/1998 | Dinkins | 375/219 |
| 6,094,427 | A | * | 7/2000 | Yi | 370/331 |
| 6,130,898 | A | * | 10/2000 | Kostreski et al. | 370/522 |
| 6,430,620 | B1 | * | 8/2002 | Omura et al. | 709/231 |
| 6,493,557 | B1 | | 12/2002 | Yoshida | |

(Continued)

FOREIGN PATENT DOCUMENTS

JP 11-184780 7/1999

(Continued)

*Primary Examiner* — Pinkal R Chokshi
(74) *Attorney, Agent, or Firm* — Wenderoth Lind & Ponack, L.L.P.

(57) ABSTRACT

A content reproduction device includes: a plurality of communication units (a cellular phone and a wireless LAN communication unit), each receiving a content transmitted in segments from a content transmission device over a communication path; a content reconstruction unit that has a buffer in which each segmented data of the content received by each of the communication units is temporarily accumulated, and that reconstructs each segmented data accumulated in the buffer into the content; a reproduction unit that reproduces, at a predetermined bit rate, the content reconstructed by the content reconstruction unit; and a communication control unit that: calculates, for every predetermined time, target transmission speeds to be assigned for content reception performed by the respective communication units, based on free space in the buffer and the bit rate; and transmits a first request signal indicating the calculated target transmission speeds to the content transmission device via one of the communication units.

16 Claims, 18 Drawing Sheets

U.S. PATENT DOCUMENTS

| | | | |
|---|---|---|---|
| 6,714,264 B1 * | 3/2004 | Kempisty | 348/732 |
| 6,941,154 B1 * | 9/2005 | Ritter | 455/550.1 |
| 6,973,662 B1 * | 12/2005 | Sie et al. | 725/25 |
| 7,002,942 B2 * | 2/2006 | Kotzin | 370/338 |
| 7,100,187 B2 * | 8/2006 | Pierzga et al. | 725/76 |
| 7,103,669 B2 * | 9/2006 | Apostolopoulos | 709/231 |
| 7,133,486 B2 * | 11/2006 | Zhang et al. | 375/377 |
| 7,228,137 B2 * | 6/2007 | Chinomi et al. | 455/456.1 |
| 7,583,953 B2 * | 9/2009 | Choi et al. | 455/405 |
| 7,617,516 B2 * | 11/2009 | Huslak et al. | 725/95 |
| 2001/0056578 A1 * | 12/2001 | Hwang et al. | 725/98 |
| 2002/0025777 A1 * | 2/2002 | Kawamata et al. | 455/3.05 |
| 2002/0059614 A1 * | 5/2002 | Lipsanen et al. | 725/75 |
| 2002/0087992 A1 * | 7/2002 | Bengeult et al. | 725/76 |
| 2002/0116715 A1 | 8/2002 | Apostolopoulos | |
| 2002/0136217 A1 * | 9/2002 | Christensen | 370/393 |
| 2002/0183026 A1 * | 12/2002 | Naruse | 455/134 |
| 2002/0183059 A1 * | 12/2002 | Noreen et al. | 455/427 |
| 2003/0051252 A1 * | 3/2003 | Miyaoku et al. | 725/109 |
| 2003/0093798 A1 * | 5/2003 | Rogerson | 725/75 |
| 2003/0110506 A1 * | 6/2003 | Kim | 725/95 |
| 2003/0122966 A1 * | 7/2003 | Markman et al. | 348/563 |
| 2003/0145328 A1 * | 7/2003 | Rabinowitz et al. | 725/72 |
| 2003/0192052 A1 * | 10/2003 | Frisco et al. | 725/76 |
| 2004/0045027 A1 * | 3/2004 | Takamura et al. | 725/78 |
| 2004/0073948 A1 * | 4/2004 | Ishibashi | 725/134 |
| 2004/0110468 A1 * | 6/2004 | Perlman | 455/13.3 |
| 2004/0154043 A1 * | 8/2004 | Roman | 725/119 |
| 2005/0013264 A1 * | 1/2005 | Sundberg | 370/328 |
| 2005/0034158 A1 * | 2/2005 | DeLaVega | 725/75 |
| 2005/0043999 A1 * | 2/2005 | Ji et al. | 705/21 |
| 2005/0091693 A1 * | 4/2005 | Amine et al. | 725/100 |
| 2005/0177851 A1 * | 8/2005 | Murao et al. | 725/75 |
| 2005/0183126 A1 * | 8/2005 | Murao et al. | 725/75 |
| 2006/0136291 A1 * | 6/2006 | Morita et al. | 705/13 |
| 2006/0184969 A1 * | 8/2006 | Yamamoto et al. | 725/58 |
| 2006/0271958 A1 * | 11/2006 | Ukai et al. | 725/46 |
| 2007/0112948 A1 * | 5/2007 | Uhlik | 709/223 |
| 2007/0150930 A1 * | 6/2007 | Koivisto et al. | 725/134 |
| 2008/0183767 A1 * | 7/2008 | Zhu et al. | 707/200 |
| 2010/0091740 A1 * | 4/2010 | Dennisson et al. | 370/335 |

FOREIGN PATENT DOCUMENTS

| | | |
|---|---|---|
| JP | 2000-175249 | 6/2000 |
| JP | 2001-257715 | 9/2001 |
| JP | 2003-224588 | 8/2003 |
| JP | 2003-258895 | 9/2003 |
| JP | 2003-319012 | 11/2003 |
| WO | 02/067588 | 8/2002 |
| WO | 03/090427 | 10/2003 |

* cited by examiner

FIG. 5

Communication fee data 1080

| Communication means | Communication fee |
|---|---|
| Cellular phone | 30 yen/minute |
| Wireless LAN communication unit | 0 yen |

FIG. 6

Communication speed initial values 1091

| | Communication means | Communication speed |
|---|---|---|
| Initial value | Cellular phone | 1Mbps |
| | Wireless LAN communication unit | 400kbps |

FIG. 7

Communication speed history 1092

| Position | Communication means | Communication speed |
|---|---|---|
| Point A | Cellular phone | 1Mbps |
| | Wireless LAN communication unit | 400kbps |
| Point B | Cellular phone | 900kbps |
| | Wireless LAN communication unit | 400kbps |
| ⋮ | ⋮ | ⋮ |
| Point N | Cellular phone | 0 |
| | Wireless LAN communication unit | 0 |
| ⋮ | ⋮ | ⋮ | ent. Streaming is used in the case where the size of a content is large and thus it takes time if its reproduction is started after the whole content is downloaded and where a copyrighted content which cannot be stored in a reproduction device is reproduced, but a communication path is required to be stable.
CONTENT TRANSMISSION DEVICE AND CONTENT REPRODUCTION DEVICE

TECHNICAL FIELD

The present invention relates to a content transmission device that transmits a content such as audio and video as well as to a content reproduction device that reproduces a content while receiving such content in a moving body.

BACKGROUND ART

Streaming is one of the methods of receiving a content such as audio and video from a server and reproducing such content. Streaming is used in the case where the size of a content is large and thus it takes time if its reproduction is started after the whole content is downloaded and where a copyrighted content which cannot be stored in a reproduction device is reproduced, but a communication path is required to be stable.

In a wireless communication in a moving body, the state of communication changes owing to various conditions such as the present position of the moving body, and it happens in an extreme case that no communication can be carried out at all. Against this backdrop, there is a communication device equipped with plural communication means so that it is possible to perform transmission and reception using one of such communication means that is selected depending on the present circumstances and a condition requested by a user (for example, refer to Patent Document 1).

FIG. 1 is a block diagram showing the structure of a conventional communication device described in Patent Document 1.

As shown in FIG. 1, such conventional communication device 900 is comprised of: a present position detector 901; a speed sensor 902; an input device 903; a controller 904; a display device 905; a DSRC device 906; a middle range device 907; a stationary satellite device 908; a cellular phone device 909; and a low orbit satellite device 910.

The present position detector 901 is connected to the controller 904, and a communication means available at the present position is selected from among plural communication means such as the DSRC device 906 and the cellular phone device 909, using a database 904a. Furthermore, the use order of the communication means is determined based on a condition requested by the user, such as communication charge and communication speed. Then, the communication means are used one by one according to such determined order and a communication is carried out using the communication means by which a communication was first carried out successfully.

Patent Document 1: Japanese Laid-Open Patent Application No. 2000-175249 (pp. 1-8, FIG. 1)

However, since the above-described on-board communication device uses only one communication means at one time, there is a problem that streaming reproduction of a content cannot be carried out properly because of insufficient transmission speed that happens in the case where the transmission speed has changed due to a change in the position of the moving body and where the maximum value of the transmission speed of one communication means is less than the rate assigned to the content for streaming.

The present invention aims at solving the above conventional problem, and it is an object of the present invention to provide a content transmission device and a content reproduction device that realize streaming reproduction in an environment in which an effective communication speed changes due to a change in the position of a moving body such as a vehicle.

SUMMARY OF THE INVENTION

In order to achieve the above object, the content reproduction device according to the present invention is a content reproduction device that performs streaming reproduction of a content, the device including: a plurality of communication units, each receiving a content transmitted in segments from a content transmission device over a communication path; a content reconstruction unit that has a buffer in which each segmented data of the content received by each of the communication units is temporarily accumulated, and that reconstructs each segmented data accumulated in the buffer into the content; a reproduction unit that extracts the content from the buffer at a predetermined bit rate and reproduces the content at the predetermined bit rate, the content having been reconstructed by the content reconstruction unit; and a communication control unit that: calculates, for every predetermined time, target transmission speeds to be assigned for content reception performed by the respective communication units, based on free space in the buffer and the bit rate; and transmits a first request signal indicating the calculated target transmission speeds to the content transmission device via one of the communication units.

With this structure, it is possible to ensure a transmission speed required for streaming reproduction by using a plurality of communication units and by determining a communication unit to be used and a target transmission speed assigned to it, based on a free space on the buffer and the bit rate.

Furthermore, in the content reproduction device according to the present invention, the first request signal may indicate addresses for said respective communication units.

Accordingly, it is possible to reliably receive the content transmitted in segments to the respective communication units.

Furthermore, in the content reproduction device according to the present invention, the first request signal may be a content obtainment command indicating addresses for said respective communication units.

Furthermore, the content reproduction device according to the present invention may further include a communication fee storage unit which stores, in advance, communication fees of the respective communication units, wherein the communication control unit determines the target transmission speeds of the respective communication units based on the communication fees.

Accordingly, it is possible to reduce the communication fees required for content reception.

Furthermore, the content reproduction device according to the present invention may further include: a present position detection unit that detects a present position; a traveling route obtainment unit that obtains a traveling route starting from the present position detected by the present position detection unit; and a reception state storage unit which stores, in advance, data reception speeds of the respective communication units at each position on the traveling route obtained by the traveling route obtainment unit, wherein the communication control unit determines the target transmission speeds of the respective communication units based on free space in the buffer and the data reception speeds of the respective communication units at a position indicated by information on a planned transit position after the present position, the data reception speeds being stored in the reception state storage unit.

Accordingly, it becomes possible to accumulate, in advance, content data used in a segment in which a communication cannot be carried out before entering such segment, and thus to ensure a transmission speed required for streaming reproduction.

Furthermore, the content reproduction device according to the present invention may further include a reception speed measurement unit that measures data reception speeds of the respective communication units, wherein the communication control unit calculates modified target transmission speeds, each being calculated based on a difference between the target transmission speed assigned for the content reception of each of the communication units and each of the data reception speeds measured by the reception speed measurement unit, and transmits a second request signal indicating the calculated target transmission speeds to the content transmission device via one of the communication units.

With this structure, it is possible to ensure a transmission speed required for streaming reproduction even when there occurs a variation in the transmission speed of the communication path over time, by using a plurality of communication units and by determining a communication unit to be used and a modified target transmission speed assigned to it, based on the measured data transmission speeds.

Furthermore, the content reproduction device according to the present invention is a content reproduction device that performs streaming reproduction of a content, the device including: a plurality of communication units, each receiving a content transmitted in segments from a content transmission device over a communication path; a content reconstruction unit that has a buffer in which each segmented data of the content received by each of the communication units is temporarily accumulated, and that reconstructs each segmented data accumulated in the buffer into the content; a reproduction unit that extracts the content from the buffer at a predetermined bit rate and reproduces the content at the predetermined bit rate, the content having been reconstructed by the content reconstruction unit; and a communication control unit that: calculates, for every predetermined time, target transmission amounts to be assigned for content reception performed by the respective communication units, based on free space in the buffer and the bit rate; and transmits a first request signal indicating the calculated target transmission amounts to the content transmission device via one of the communication units.

With this structure, it is possible to ensure a transmission speed required for streaming reproduction by using a plurality of communication units and by determining a communication unit to be used and a target transmission amount assigned to it, based on a free space on the buffer and on the bit rate.

Also, the content transmission device according to the present invention is a content transmission device that transmits a content over a communication path, the device including: a content accumulation unit that accumulates a content; a communication unit that communicates, over the communication path, with a content reproduction device that includes a plurality of communication units with different addresses; and a content segmentation unit that: determines amounts of content data to be transmitted based on target transmission speeds of the respective addresses every time a first request signal indicating target transmission speeds of the respective addresses is received, the amounts of content data to be transmitted being determined for the respective addresses; segments the content accumulated in the content accumulation unit; and transmits each segmented data of the content addressed to each of the addresses via the communication unit.

With this structure, it is possible to transmit a content in a manner that makes it possible for the content reproduction device including a plurality of communication units to perform streaming reproduction.

Furthermore, the content transmission device according to the present invention is a content transmission device that transmits a content over a communication path, the device including: a content accumulation unit that accumulates a content; a communication unit that communicates, over the communication path, with a content reproduction device that includes a plurality of communication units with different addresses; and a content segmentation unit that: determines amounts of content data to be transmitted based on target transmission amounts of the respective addresses every time a first request signal indicating target transmission amounts of the respective addresses is received, the amounts of content data to be transmitted being determined for the respective addresses; segments the content accumulated in the content accumulation unit; and transmits each segmented data of the content addressed to each of the addresses via the communication unit.

With this structure, it is possible to transmit a content in a manner that makes it possible for the content reproduction device including a plurality of communication units to perform streaming reproduction.

Furthermore, the content transmission device according to the present invention is a content transmission device that transmits a content over a communication path, the device including: a plurality of communication units; a content accumulation unit that accumulates the content; a transmission speed measurement unit that measures data transmission speeds of the respective communication units; a communication control unit that assigns target transmission speeds to the respective communication units based on the data transmission speeds measured by the transmission speed measurement unit; and a content segmentation unit that segments the content based on the target transmission speeds, and transmits the segmented data of the content via the communication units.

With this structure too, it is possible to transmit a content in a manner that makes it possible for the content reproduction device including a plurality of communication units to perform streaming reproduction.

Furthermore, the content transmission device according to the present invention may further include a communication fee storage unit which stores, in advance, communication fees of the respective communication units, wherein the communication control unit determines the target transmission speeds of the respective communication units based on the communication fees.

Accordingly, it is possible to reduce the communication fees required for content reception.

Furthermore, the content transmission device according to the present invention may further include: a present position detection unit that detects a present position and outputs present position information; a traveling route storage unit that stores information on planned transit positions; and a reception state storage unit which stores data reception speeds of the respective communication units at each position indicated in the position information, wherein the communication control unit determines the target transmission speeds of the respective communication units based on the data reception speeds of the respective communication units at a position indicated by the information on planned transit positions after the present position, the data reception speeds being stored in the reception state storage unit.

Accordingly, it becomes possible to accumulate, in advance, content data used in a segment in which a communication cannot be carried out before entering such segment, and thus to ensure a transmission speed required for streaming reproduction.

Note that not only it is possible to embody the present invention as the content transmission device and content reproduction device as described above, but also as: a content transmission method and a content reproduction method that include, as their respective steps, the characteristic constituent elements included in such content transmission device and content reproduction device; and as programs causing a computer to execute such steps. It should be also noted that such programs can be distributed on a recording medium such as a CD-ROM and over a transmission medium such as the Internet.

As is obvious from the above description, the content transmission device and content reproduction device of the present invention are capable of realizing the streaming reproduction of a content even in the case where the transmission speed changes due to a change in the position of a moving body and where the maximum value of the transmission speed of one communication means is less than the rate assigned to the content for streaming.

Thus, the present invention, which allows for a stable streaming reproduction of a content, offers an extremely high practical value in the present age that has seen the advent of various communication means and proliferation of content distribution carried out over a communication path such as the Internet.

BRIEF DESCRIPTION OF DRAWINGS

FIG. 5 is a diagram showing an example structure of communication fee data 1080 stored in a communication fee data accumulation unit 108.

FIG. 6 is a diagram showing an example structure of communication speed initial values 1091 stored in a communication state data accumulation unit 109.

FIG. 7 is a diagram showing an example structure of a communication speed history 1092 stored in the communication state data accumulation unit 109.

NUMERICAL REFERENCES

Figure 1:
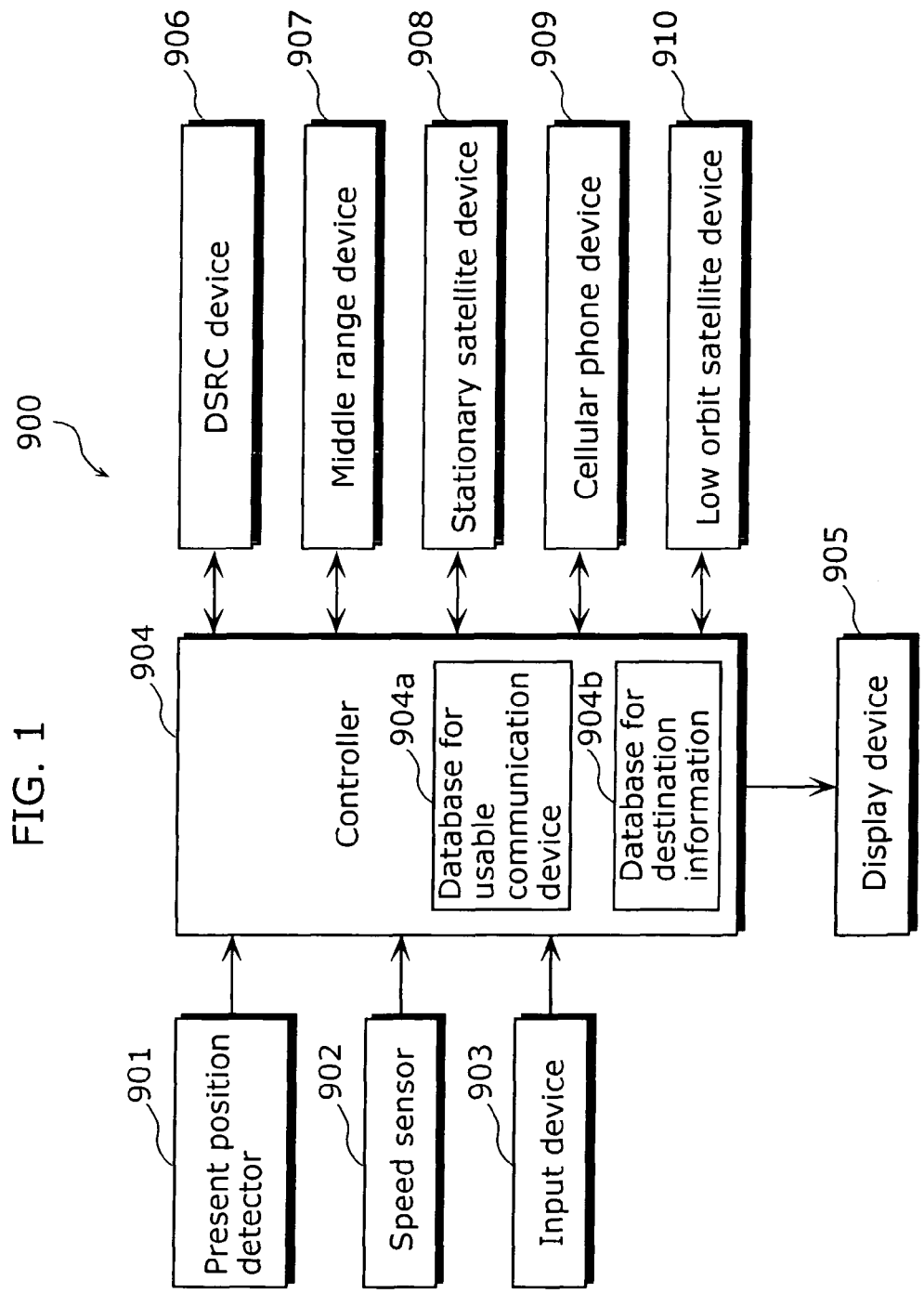
FIG. 1 is a block diagram showing the structure of a conventional communication device.

1 Content transmission/reception system
10 Content reproduction device
20, 20a Content transmission device
40 Communication path
101 Cellular phone
102 Cellular phone IF unit
103, 105 Transmission/reception speed measurement unit
104 Wireless LAN communication unit
106 Present position detection unit
107 Navigation unit
108 Communication fee data accumulation unit
109 Communication state data accumulation unit
110 Communication control unit
111 Display
112 User operation input unit
113 Content reconstruction unit
114 Reproduction unit
201 Content accumulation unit
202 Packetization unit
203 Communication unit

DETAILED DESCRIPTION OF THE INVENTION

The following describes embodiments of the present invention with reference to the drawings.

First Embodiment

Figure 2:
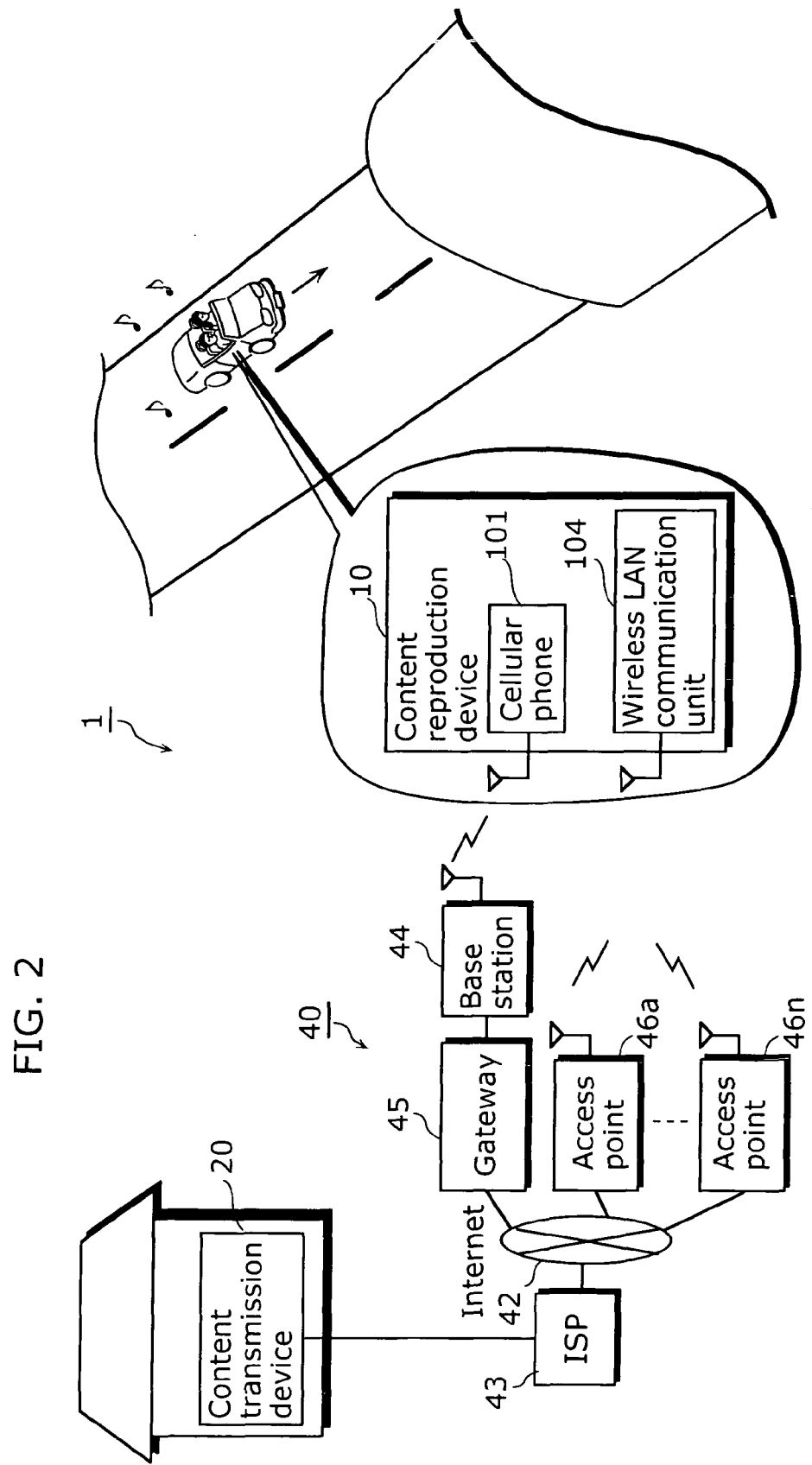
FIG. 2 is a diagram showing an overall structure of a content transmission/reception system 1 according to a first embodiment of the present invention.

FIG. 2 is a diagram showing an overall structure of a content transmission/reception system 1 according to the first embodiment of the present invention.

As shown in FIG. 2, the content transmission/reception system 1 is composed of a content reproduction device 10, a content transmission device 20, and a communication path 40 that interconnects the content reproduction device 10 and the content transmission device 20 to allow them to communicate with each other. Such content transmission/reception system 1 is intended for receiving a content from the content transmission device 20 over the communication path 40, and performing the streaming reproduction of such content in the content reproduction device 10 at a predetermined bit rate, while receiving such content. Note that the first embodiment is described on the assumption that the content transmission device 20 is equipped in a house and the content reproduction device 10 is equipped on a vehicle, respectively.

The communication path 40 is comprised of the following components that are located with the Internet 42 at the center: an Internet service provider (hereinafter also described as the "ISP") connected to the Internet 42; a gateway 45 and a base station 44 making up a cellular phone network; and plural access points 46a to 46n making up a wireless LAN. These access points 46a to 46n are located successively along a road to allow even a moving vehicle to carry out a communication.

The content transmission device 20 is connected to the Internet 42 via the ISP 43.

The content reproduction device 10 is comprised of a cellular phone 101 and a wireless LAN communication unit 104, and is connected to the Internet 42 over the cellular phone network and the wireless LAN. More specifically, Internet connection using the cellular phone 101 is made via the base station 44 and the gateway 45. Internet connection using the wireless LAN communication unit 104 is made via the plural access points 46a to 46n.

Figure 3:
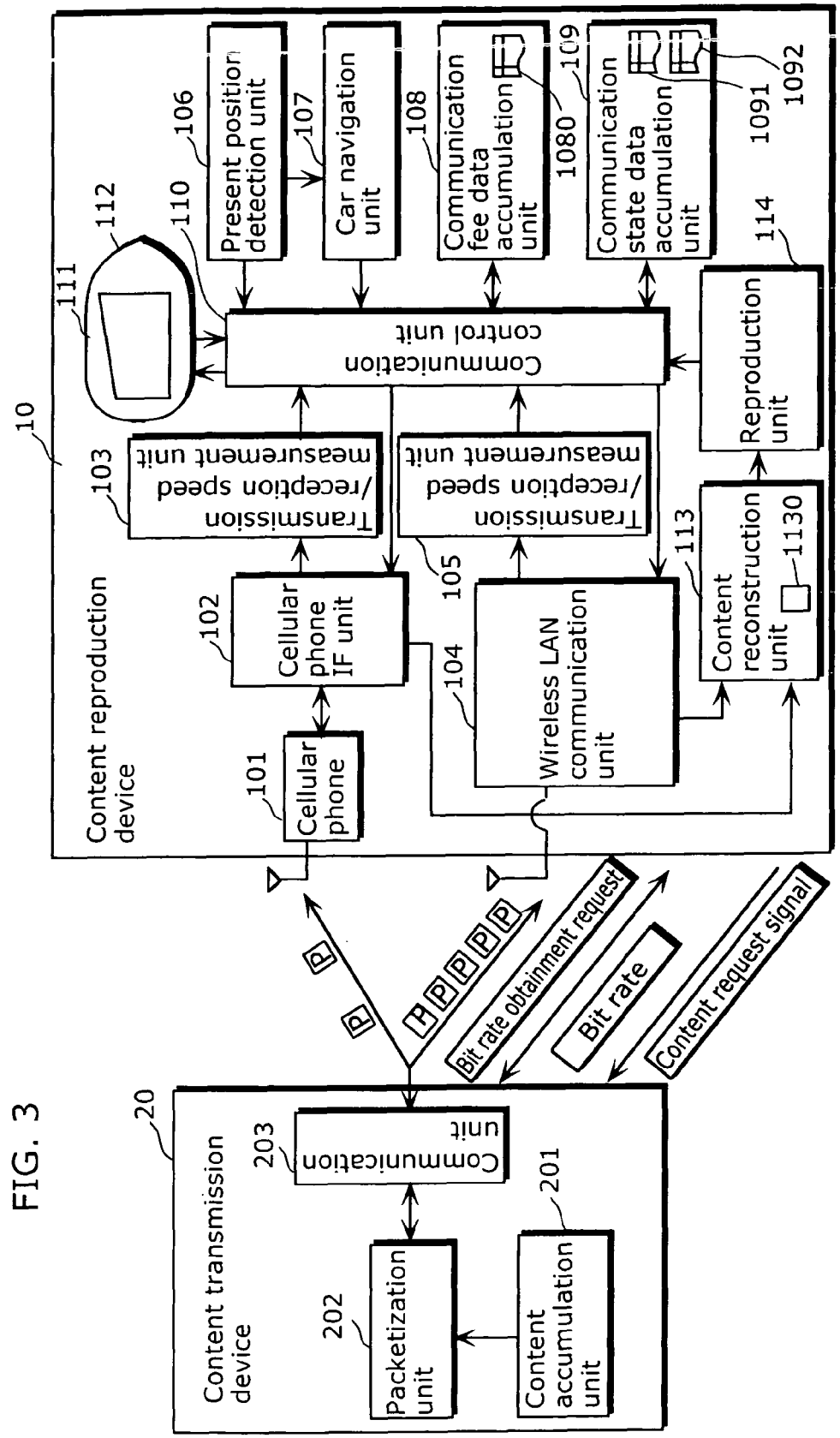
FIG. 3 is a block diagram showing detailed structures of a content reproduction device 10 and a content transmission device 20 shown in FIG. 2.

FIG. 3 is a block diagram showing detailed structures of the content reproduction device 10 and the content transmission device 20. Note that the communication path 40 is not illustrated in FIG. 3.

As shown in FIG. 3, the content reproduction device 10 is comprised of: a cellular phone 101, a cellular phone IF unit 102, a wireless LAN communication unit 104, transmission/reception speed measurement units 103 and 105, a present position detection unit 106, a navigation unit 107, a communication fee data accumulation unit 108, a communication state data accumulation unit 109, a communication control unit 110, a display 111, a user operation input unit 112, a content reconstruction unit 113, and a reproduction unit 114, or the like.

The cellular phone 101 performs data transmission/reception over the cellular phone network.

The cellular phone IF unit 102 is connected to the cellular phone 101, and accepts/outputs data transmitted/received by the cellular phone 101.

The transmission/reception speed measurement unit 103 measures a data size per unit time of data transmitted/received by the cellular phone IF unit 102.

The wireless LAN communication unit 104 performs data transmission/reception over the wireless LAN.

The transmission/reception speed measurement unit 105 measures a data size per unit time of data transmitted/received by the wireless LAN communication unit 104.

The present position detection unit 106, which includes a GSP or the like, detects the present position, and outputs present position information.

The navigation unit 107, which is a car navigation device, has map data, holds route information about the route to a destination set by the user, and others. Note that in the case where the user has not set route information, the navigation unit 107 generates route information by predicting the route the user is taking after the present position, based on the present position and the traveling direction.

The communication fee data accumulation unit 108 accumulates communication fee data 1080 indicating communication fees per unit data size for the respective cases where communications are carried out using the cellular phone 101 and the wireless LAN communication unit 104.

The communication state data accumulation unit 109 accumulates initial values 1091, as well as a communication speed history 1092 indicating a relationship between a position where a communication is carried out and a communication state for each of the cellular phone 101 and the wireless LAN communication unit 104. Recorded as an initial value 1091 of a communication speed is either an initial value of data transmission/reception speed inputted by the user or a default value appropriate for the type of a communication means in the case where an initial value is not inputted. Recorded as the communication speed history 1092 are values measured by the transmission/reception speed measurement unit 103 and the transmission/reception speed measurement unit 105 at the time when communications are actually carried out.

The display 111, which includes a liquid crystal display or the like, displays, on the liquid crystal display screen, a variety of information in a visually distinguishable manner.

The user operation input unit 112, which includes a keyboard, a mouse, a touch panel, or the like, accepts a user instruction.

The content reconstruction unit 113, which includes a buffer 1130 therein, buffers data of the content respectively received by the cellular phone IF unit 102 and the wireless LAN communication unit 104, reconstructs each segmented data of the content into the content before being segmented, and outputs the reconstructed content.

The reproduction unit 114 reproduces the content such as audio and video outputted from the buffer 1130 of the content reconstruction unit 113 at a predetermined bit rate.

The communication control unit 110 is intended for controlling the units included in the content reproduction device 10 in an integrated manner. Upon receipt of an instruction to reproduce a content via the user operation input unit 112, the communication control unit 110 generates and outputs a content bit rate obtainment request as well as calculating target data reception speeds at which the content is received using the cellular phone 101 and the wireless LAN communication unit 104, respectively, based on the respective data reception speeds, communication fee data, communication state data or the like of the cellular phone IF unit 102 and the wireless LAN communication unit 104, so as to generate and output a content request signal to be transmitted to the content transmission device 20.

Meanwhile, the content transmission device 20 is comprised of a content accumulation unit 201, a packetization unit 202, and a communication unit 203.

The content accumulation unit 201 accumulates contents such as audio and video.

The communication unit 203 transmits data based on a destination address attached in a packet header, as well as receiving data.

The packetization unit 202 is intended for controlling the content transmission device 20 in an integrated manner. When receiving a content bit rate obtainment request via the communication unit 203, the packetization unit 202 obtains the bit rate of the content from the content accumulation unit 201, and sends the bit rate to the requesting content reproduction device 10, and when receiving a content request signal, the packetization unit 202 segments the content into data with a certain data size, packetizes each data by attaching a packet header, and outputs the resultant.

Next, a description is given of the procedures taken by the content reproduction device 10 and the content transmission device 20 when transmitting and receiving a content.

First, a description is given of preprocessing performed before a content is transmitted/received.

Before receiving the content, the user inputs communication fees required by the respective communication means used by the content reproduction device 10.

Figure 4:
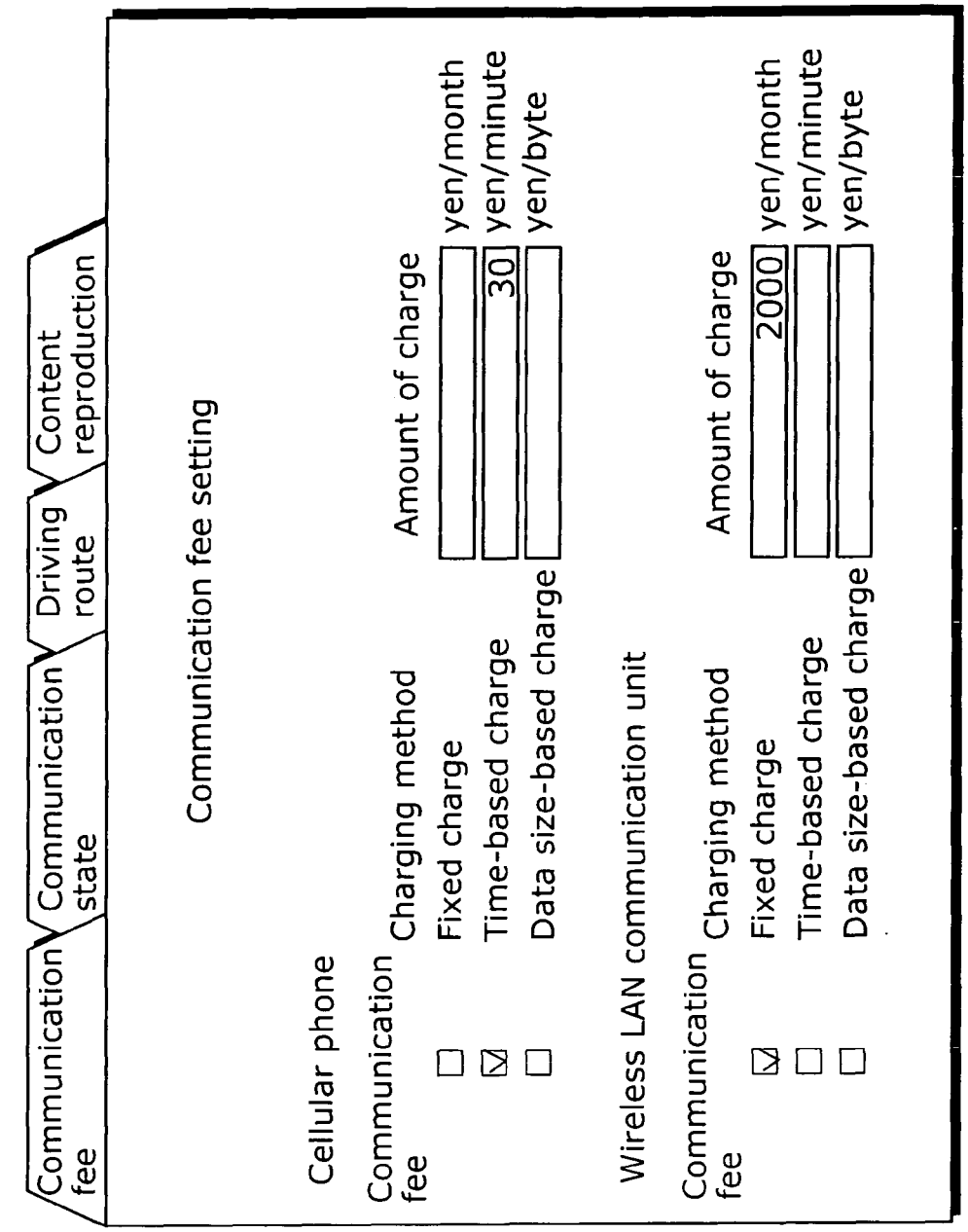
FIG. 4 is a diagram showing an example structure of a screen, displayed on a display 111, for setting communication fees.

In this case, after the user operation input unit 112 performs a predetermined operation, the communication control unit 110 displays, on the display 111, a screen for setting communication fees as shown in FIG. 4 so as to accept an input of communication fees. Each communication fee is represented by a charging method and the amount of charge. A charging method is selected from "fixed charge", "time-based charge", "data size-based charge", or the like. Inputted as a charge amount is: how much yen is charged per how long minutes in the case of "time-based charge"; and how much yen is charged per how much bytes in the case of "data size-based charge".

The values inputted are stored in the communication fee data accumulation unit 108.

The following is assumed as an example of the communication fees in the first embodiment: the communication fee in the case of using the cellular phone 101 is "30 yen per one minute" in "time-based charge" and the communication fee in the case of using the wireless LAN communication unit 104 is "fixed charge".

FIG. 5 shows the communication fee data 1080 for the above case to be stored in the communication fee data accumulation unit 108.

The user also inputs initial values of the data transmission/reception speeds. In the case where initial values are not inputted, default values appropriate for the types of the respective communication means are set. The values inputted are stored in the communication state data accumulation unit 109 as communication speed initial values 1091.

FIG. 6 shows the communication speed initial values 1091 for the above case to be stored in the communication state data accumulation unit 109.

The communication control unit 110 obtains the following data, while the vehicle is moving, in association with each point on the driving route: telephone calls, carried out by use of the cellular phone 101 and the wireless LAN communication unit 104, measured by the transmission/reception speed measurement units 103 and 105; data transmission/reception speeds of the respective communication means in data communications or the like. Such obtained data is stored in the communication state data accumulation unit 109 as the communication speed history 1092.

FIG. 7 is a diagram showing an example structure of the communication speed history 1092.

An example illustrated in this drawing shows that a communication was carried out at the following communication speeds at the respective points: at a point A, 1 Mbps in the case of the cellular phone 101 and 400 kbps in the case of the wireless LAN communication unit 104; at a point B, 900 kbps in the case of the cellular phone 101 and 400 kbps in the case of the wireless LAN communication unit 104; . . . ; and at a point N, neither the cellular phone 101 nor the wireless LAN communication unit 104 was able to carry out a communication. Thus, the reception speed of a content is limited to the above communication speeds or lower at the respective points.

Next, descriptions are given, one by one, of the operations performed by the respective units in the content transmission/reception system 1.

Figure 8:
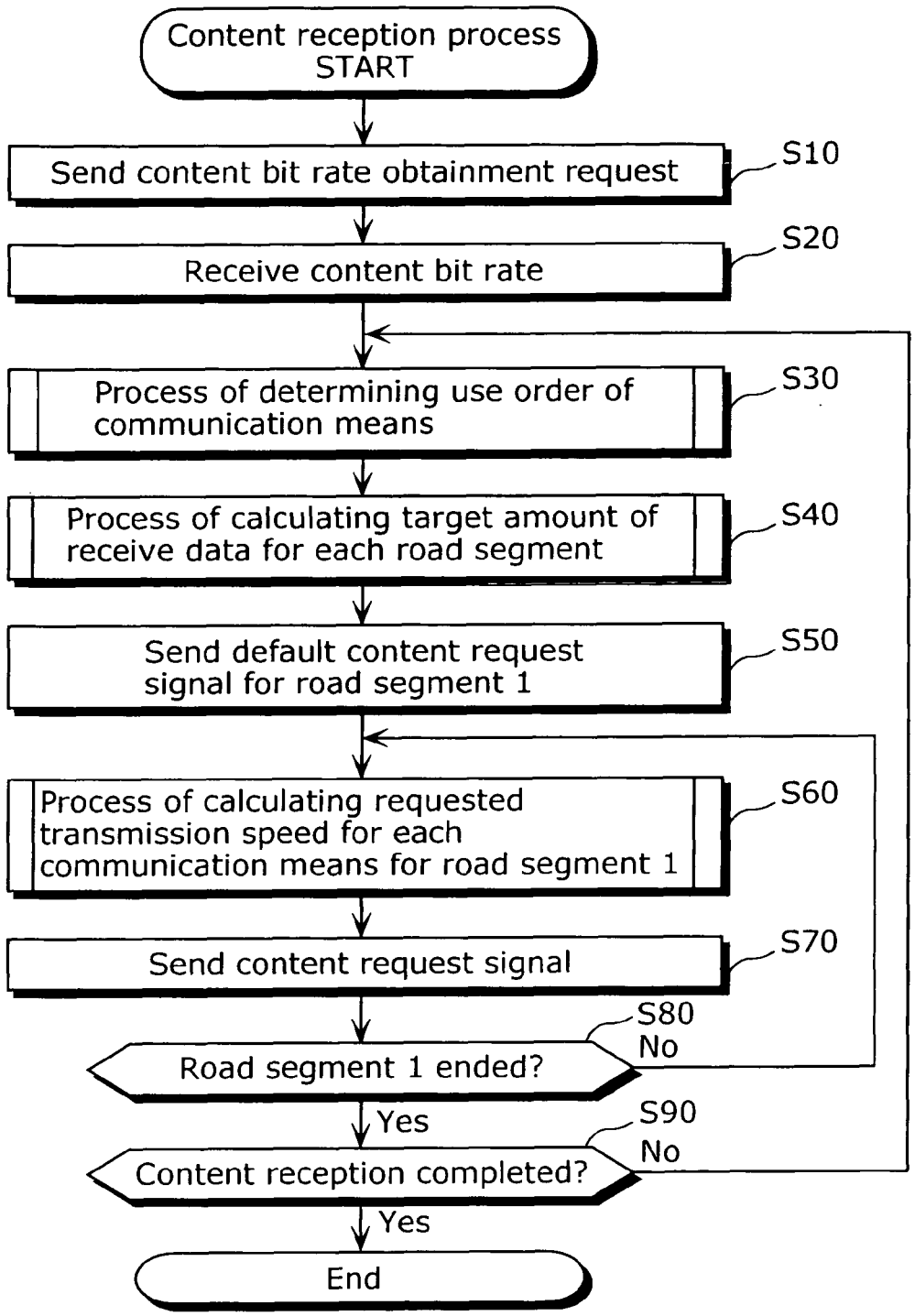
FIG. 8 is a flowchart showing the operation performed by a communication control unit 110 when obtaining a content.

First, referring to the flowchart shown in FIG. 8, a description is given of the operation performed by the communication control unit 110, in the content transmission/reception system 1 of the first embodiment, when the content reproduction device 10 obtains a content from the content transmission device 20.

FIG. 8 is a flowchart showing the operation performed by the communication control unit 110 when obtaining a content.

Upon receipt of an instruction to reproduce a specified content via the user operation input unit 112, the communication control unit 110 of the content reproduction device 10 sends a content bit rate obtainment request 50 for requesting the transmission of the bit rate of the content to be reproduced (S10), and obtains the bit rate of such content from the content transmission device 20 (S20).

Figure 9:
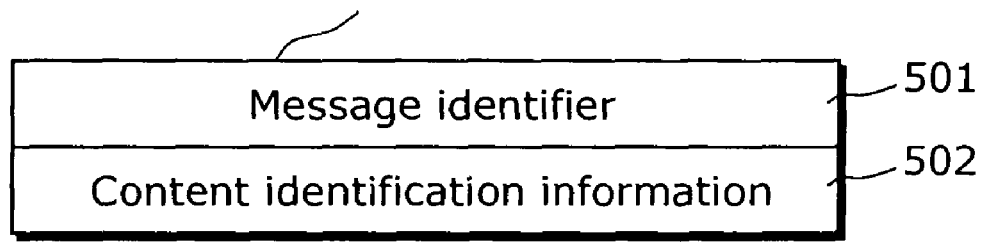
FIG. 9 is a diagram showing an example structure of a content bit rate obtainment request.

As shown in FIG. 9, the content bit rate obtainment request 50 is made up of a message identifier 501 indicating that this request is a bit rate obtainment request, and a content identification information 502 to identify the content to be reproduced. Note that either the cellular phone 101 or the wireless LAN communication unit 104 may be used as a communication means for transmitting this content bit rate obtainment request 50, but it is preferable to use the wireless LAN communication unit 104 which does not require any communication fee.

After obtaining the bit rate, the communication control unit 110 performs a process of determining the use order of plural communication means, based on the communication fees of the respective communication means accumulated as the communication fee data 1080 (S30).

Figure 10:
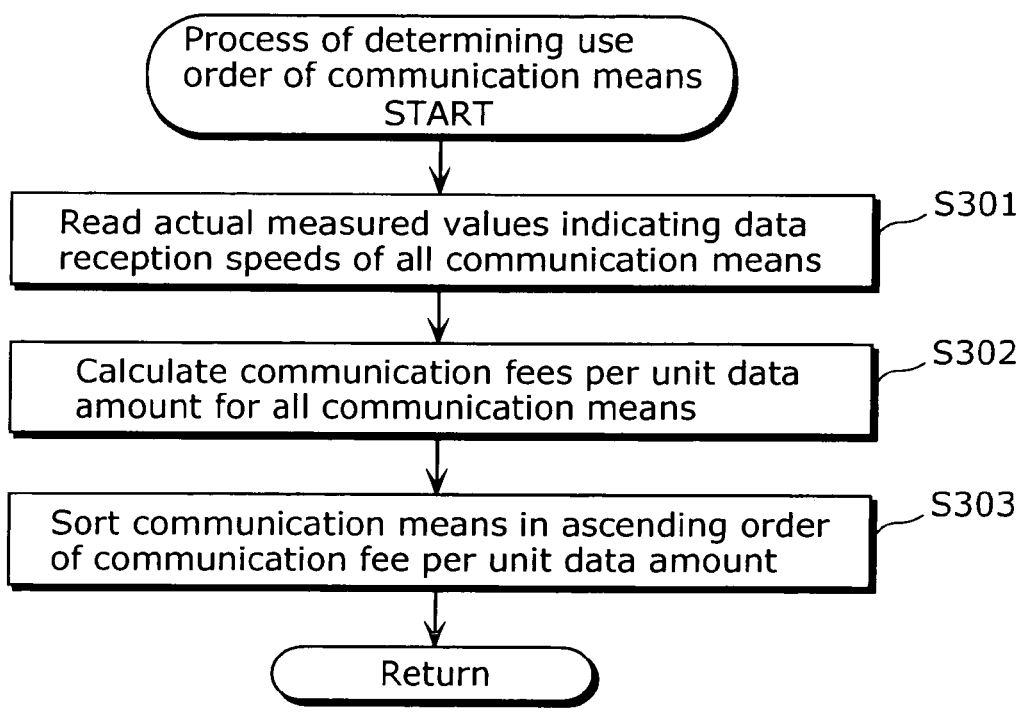
FIG. 10 is a flowchart showing a subroutine of the process of determining the use order of communication means (S30) shown in FIG. 8.

FIG. 10 is a flowchart showing a subroutine of the process of determining the use order of communication means (S30) shown in FIG. 8.

First, the communication control unit 110 reads the stored actual measured values indicating the data reception speeds of all the communication means (S301). In the case where the reception speed data for the present position is included in the communication speed history 1092 in the communication state data accumulation unit 109, the value of such reception speed data is used. In the case where the reception speed data for the present position is not stored in the communication state data accumulation unit 109, the reception speed data for the position closest to the present position is used. In the case where there is no reception speed data at all, initial values which are inputted by the user and which are stored as the communication speed initial values 1091 are used. As an example reception speed data, the first embodiment assumes that the reception speed data in the case of using the cellular phone 101 is 1 Mbps, and the reception speed data in the case of using the wireless LAN communication unit 104 is 400 kbps.

Next, the communication control unit 110 calculates a communication fee per unit data amount for each of all the communication means (S302). Here, taking that unit data is 1 Mbyte, a communication fee per unit data amount for a communication using the cellular phone 101 is $30/(1/8*60)=4$ yen, whereas a communication fee per unit data amount for a communication using the wireless LAN communication unit 104 is 0 yen since "fixed charge" is set.

Next, the communication control unit 110 sorts the communication means in ascending order of communication fees per unit data amount of all the communication means (S303), and determines the resultant as the use order of the communication means. In an example of the first embodiment, the order is (1) the wireless LAN communication unit 104, and (2) the cellular phone 101.

After determining the use order of the communication means in Step S30, the communication control unit 110 performs a process of calculating the target amount of receive data in which a road on which the vehicle is planning to go is segmented at every constant driving time and the target amount of receive data of each resulting road segment is calculated (S40).

Figure 11:
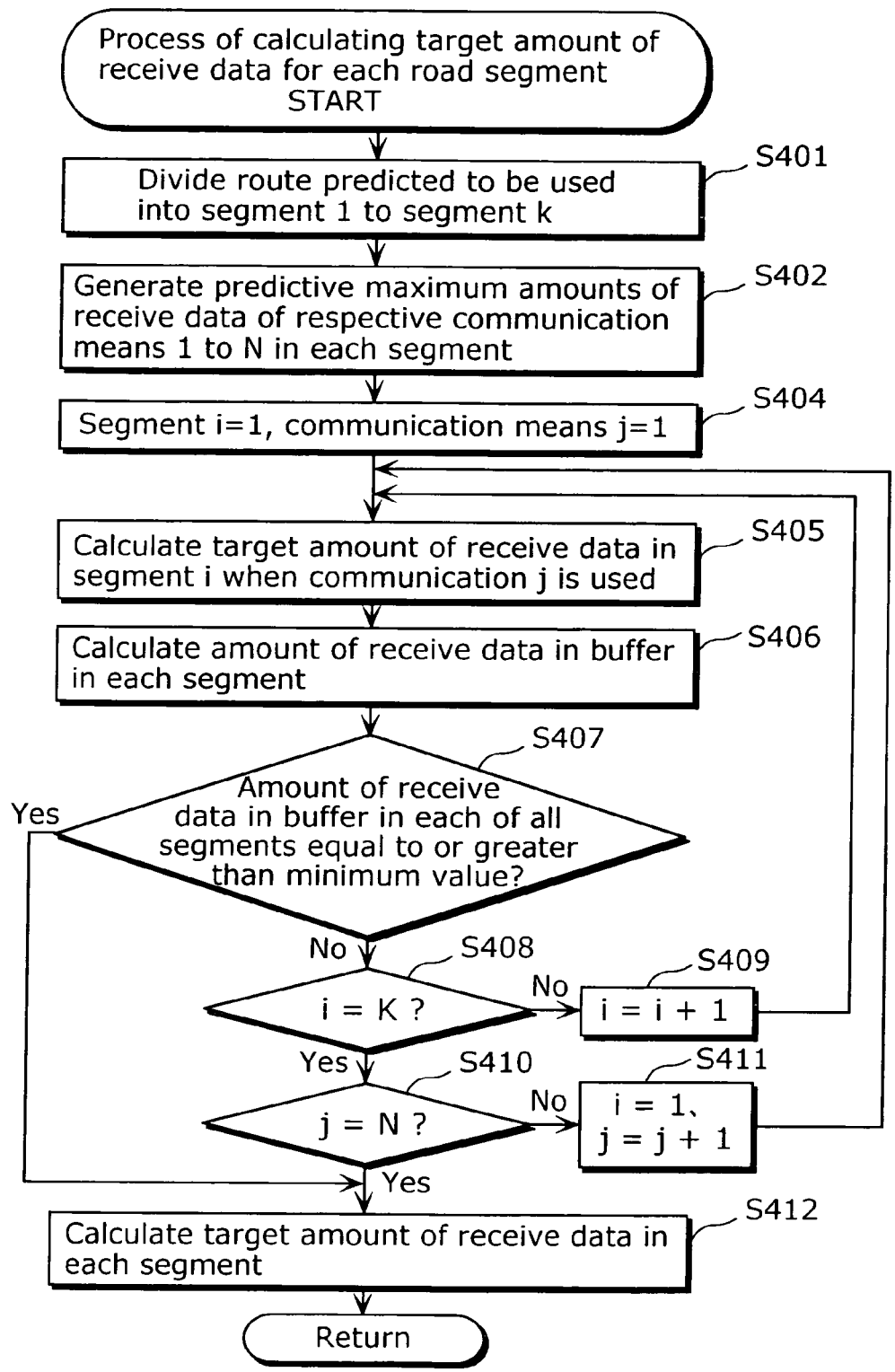
FIG. 11 is a flowchart showing a subroutine of the process of calculating the target amounts of receive data shown in FIG. 8.

FIG. 11 is a flowchart showing a subroutine of the process of calculating the target amounts of receive data shown in FIG. 8.

First, the communication control unit 110 segments, at every constant driving time, a road on which the vehicle is planning to go, beginning with the present position to a position that is arrived after driving for a certain length of time (S401). As an example, it is assumed that the road is segmented into 15 segments at every four seconds beginning with the present position to a position that is arrived after one minute drive. Positions to be segmented are calculated on the assumption that the vehicle keeps running at the current speed on a road included in the route information recorded in the navigation unit 107.

Next, the communication control unit 110 generates prediction values for the maximum amounts of receive data in each segment generated in Step S401 for the respective communication means (S402). Such prediction values are generated based on the reception speed data recorded as the communication speed history 1092 or the communication speed initial values 1091 in the communication state data accumulation unit 109.

Figure 12:
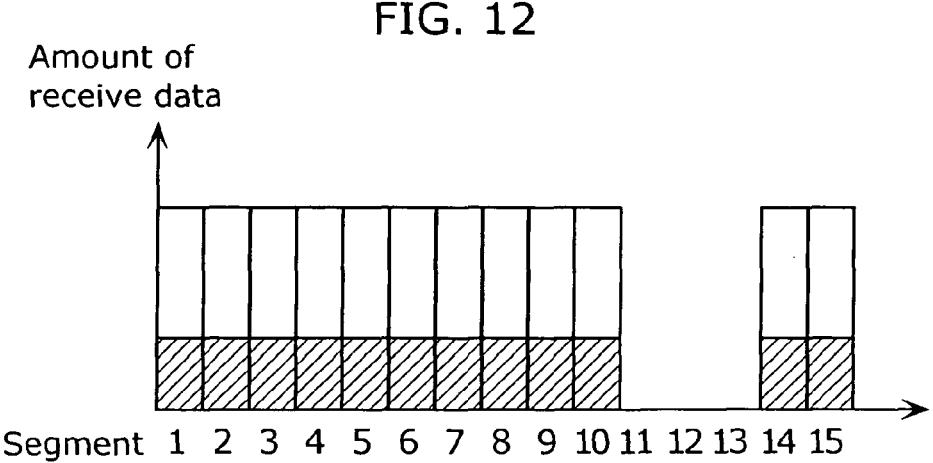
FIG. 12 is a diagram showing an example of prediction values for the maximum amounts of receive data.

FIG. 12 is a diagram showing an example of prediction values for the maximum amounts of receive data. In FIG. 12, the diagonally shared parts in the bottom indicate prediction values for the wireless LAN, and the plain parts at the top indicate prediction values for the cellular phone.

In a segment 1 to a segment 10, a segment 14, and a segment 15, data reception at 400 kbps is always possible using the wireless LAN communication unit 104, whereas data reception at 1 Mbps is always possible using the cellular phone 101.

Since each segment is equivalent to four seconds, the prediction value for the maximum amount of receive data in each segment is 200 Kbyte (400*4/8=200) in the case of the wireless LAN, and 500 Kbyte (1M*4/8=500) in the case of the cellular phone.

Segments 11 to 13 are segments in which neither the wireless LAN nor the cellular phone can carry out any communications, and thus their prediction value for the maximum amount of receive data is 0 byte.

Next, the target amount of receive data is determined for each combination of a segment and a communication means based on the ascending order of closeness to the present position in the case of the segments and on the use order determined in Step S30 shown in FIG. 8 in the case of the communication means.

First, the communication control unit 110 sets 1 to a segment numbered i and 1 to a communication means numbered j (S404). The segments and the communication means are numbered in ascending order, i.e., the order of closeness to the present position in the case of the segments, and the use order determined in Step S30 shown in FIG. 8 in the case of the communication means. Here, the wireless LAN communication unit 104 serves as a communication means 1 and the cellular phone 101 serves as a communication means 2.

Next, the communication control unit 110 calculates the target amount of receive data of the communication means j in the segment i (S405). The target amount of receive data should be the maximum amount of data that the communication means can receive in the range not exceeding the capacity of the buffer 1130 of the content reconstruction unit 113 when the received content is stored in the buffer 1130 in the content reconstruction unit 113. The upper limit threshold of 950 Kbyte is set, for example, as the range not exceeding the capacity of the buffer 1130 (e.g., 1 Mbyte).

Next, the communication control unit 110 calculates how much data is to be stored in the buffer 1130 in each of all the segments on the assumption that content data equivalent to the target amounts of receive data of all the communication means for all segments calculated so far are written to the buffer 1130, and the content is read, from the buffer 1130 of the content reconstruction unit 113, at the content bit rate obtained in Step S20 (S406).

For example, assuming that the content bit rate is 500 kbps, the amount of data stored in the buffer 1130 at the present position is 800 Kbytes, and the target amount of receive data of the communication means 1 (here, the wireless LAN communication unit 104) in segment 1 is 200 Kbytes, the amount of data stored in the buffer 1130 in segment 1 is 800 k+200 k−250 k=750 Kbytes. Assuming that the communication means 1 will stop receiving the content in segment 2 and thereafter, the amount of data stored in the buffer 1130 decreases in segment 2 and thereafter by 250 Kbytes, resulting in 500 Kbytes, 250 Kbytes, 0 byte, . . . . Here, in the case where the calculation result indicates minus as the amount of data in the buffer 1130, it is handled as such.

Next, the communication control unit 110 judges whether or not the amount of data, calculated in Step S406, to be stored in the buffer 1130 in each of all the segments, is equal to or greater than a predetermined minimum value (S407).

This judgment is intended for checking whether or not the target amounts of receive data calculated so far are sufficient for successful reproduction of the content without causing an underflow in the buffer 1130 of the content reconstruction unit 113. Here, assuming that the minimum value of data in the buffer 1130 is 200 Kbytes, the condition is not satisfied, in the case where the segment number i is 1 and the communication means number is j, since the amount of data becomes 0 byte in the segment 4.

In the case where the condition is not satisfied in Step S407 (No in S407), the communication control unit 110 judges whether or not the current segment number is the largest value K (here "15") (S408). When the segment number is not the largest value K (No in S408), the communication control unit 110 increments the segment number i by "1" (S409), and repeatedly performs Steps S405 to S409 until the amounts of receive data in the buffer in all the segments become the minimum value or greater or until the segment number reaches the largest value K. Accordingly, the target amounts of receive data in the segment 2, . . . , are calculated one by one for the communication means with the communication means number 1.

Meanwhile, in the case where the amounts of receive data in the buffer in all the segments are less than the minimum value (No in S407), and where the segment number is the largest value K in Step S408 (Yes in S408), the communication control unit 110 judges whether or not the communication means number j is the largest value N (here "2") (S410). When the communication means number is not the largest value N (here "2") (No in S410), the communication control unit 110 increments the communication means number j by "1" and sets the segment number i to "1" (S411), and repeatedly performs Steps S405 to S409 until the amounts of receive data in the buffer in all the segments become the minimum value or greater or until the segment number reaches the largest value K. Accordingly, the target amounts of receive data in the segment 1, . . . , are calculated one by one for the communication means with the communication means number 2.

In the case where the condition is satisfied in Step S407 (Yes in S407), the process proceeds to Step S412. Also in the case where the communication means number j is the largest value "N" (Yes in S410), the process also proceeds to Step S412.

In Step S412, the communication control unit 110 calculates a sum of the target amounts of receive data of the communication means 1 to the communication means N on a segment-by-segment basis, as the target amount of receive data of each segment (S412), and returns to the main routine shown in FIG. 8.

Figure 13:
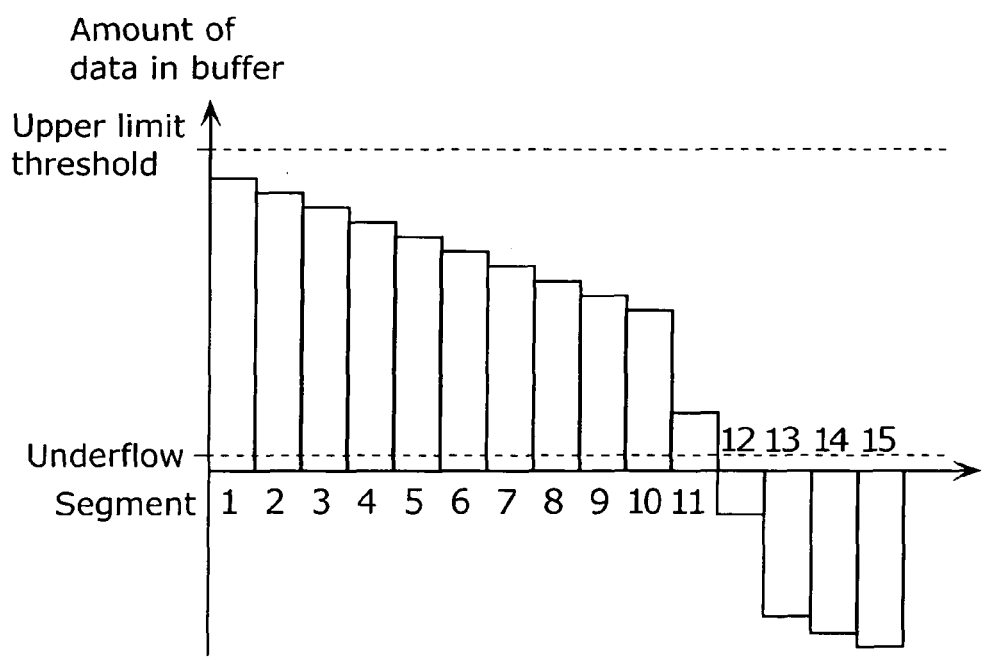
FIG. 13 is a diagram showing a result of determining the data amount in a buffer 1130 in each segment in the case of using a wireless LAN communication unit 104, after determining the target amounts of receive data for all the segments.

FIG. 13 is a diagram showing the result of determining the data amount in the buffer 1130 in each segment in the case of using the wireless LAN communication unit 104 with the communication means number 1, after determining the target amounts of receive data for all the segments. Suppose here that the target amount of receive data is 200 Kbytes in the segment 1 to the segment 10, the segment 14, and the segment 15, and "0" byte in the segment 11 to the segment 13.

In this case, since an underflow occurs in the buffer 1130 of the content reconstruction unit 113 in the segment 12 and thereafter, the cellular phone 101 being the next communication means is to be also used. In other words, in the case where a communication using the wireless LAN communication unit 104 will suffice, only the wireless LAN communication unit 104 is used, whereas in the case where an underflow occurs in the future, the cellular phone 101 is also used.

Figure 14:
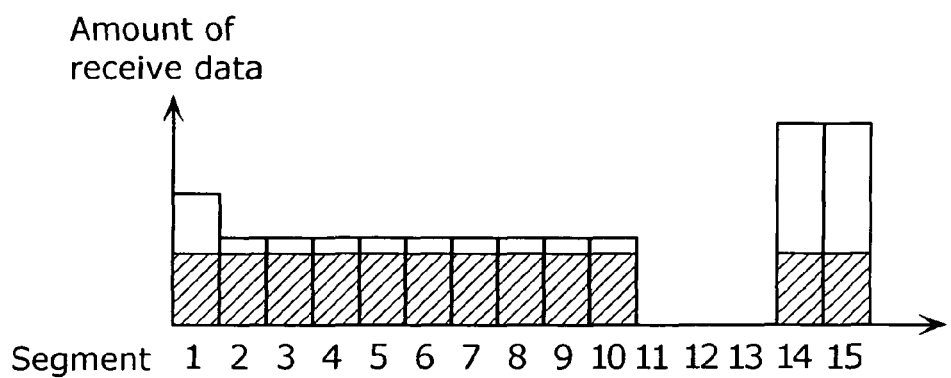
FIG. 14 is a diagram showing a result of determining the target amounts of receive data for all the segments for the wireless LAN communication unit 104 and a cellular phone 101.
Figure 15:
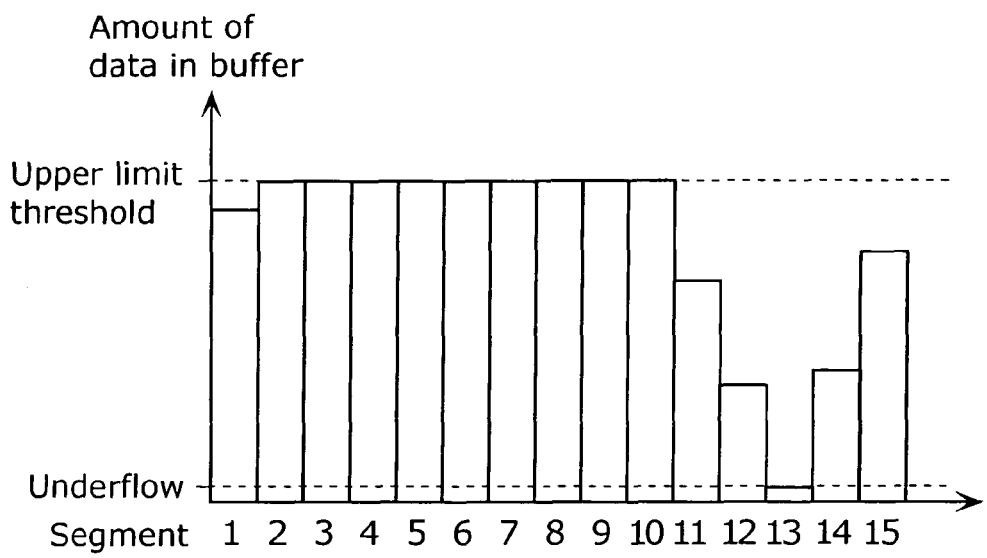
FIG. 15 is a diagram showing a result of determining the amount of data to be stored in the buffer 1130 in each segment after determining the target amounts of receive data for the wireless LAN communication unit 104 and the cellular phone 101.

FIG. 14 is a diagram showing the result of determining the target amounts of receive data for all the segments for the wireless LAN communication unit 104 and the cellular phone 101, and FIG. 15 is a diagram showing the result of determining, based on the result shown in FIG. 14, the amount of data to be stored in the buffer 1130 in each segment. In FIG. 14, the diagonally shared parts in the bottom indicate the target amounts of receive data using the wireless LAN, and the plain parts at the top indicate the target amounts of receive data using the cellular phone.

In this case, the target amounts of data using the wireless LAN communication unit 104 and the cellular phone 101 in the segment 1 are 200 Kbytes, respectively, and thus their sum is 400 Kbytes. Therefore, 400 Kbps serves as a requested transmission speed, for the wireless LAN communication unit 104, to be stored in a default content request signal that is transmitted in Step S50, and 400 Kbps also serves as a requested transmission speed for the cellular phone 101.

After calculating in Step S40 the target amount of receive data in each road segment, the communication control unit 110 generates and sends a default content request signal for the road segment 1, based on the target amount of receive data in the road segment 1 starting from the present position (S50).

Figure 16:
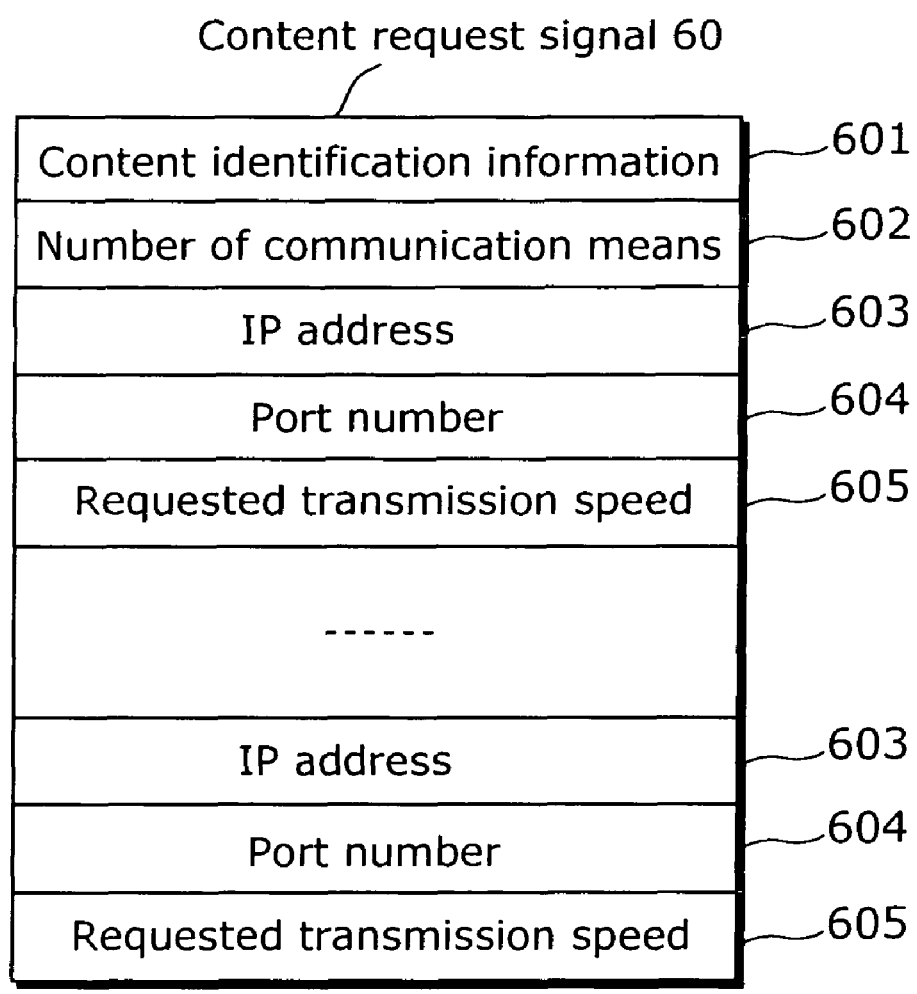
FIG. 16 is a schematic diagram showing the data structure of a content request signal.

FIG. 16 is a diagram showing the data structure of the content request signal.

As shown in FIG. 16, a content request signal 60, which is a content obtainment command for obtaining a content, is made up of: content identification information 601 to identify a content that is requested to be transmitted; the number of communication means 602 indicating the number of communication means used by the content reproduction device 10 to receive the content; an IP address 603 used by each communication means; a port number 604 used by each communication means; and a requested transmission speed 605 of each communication means. Note that the IP address 603, port number 604, and requested transmission speed 605 are provided in number equivalent to the number of the communication means.

Here, the requested transmission speed is the speed at which the content reproduction device 10 requests the content transmission device 20 to transmit the content. A different transmission speed can be set as a requested transmission speed for each communication means. In the segment 1, 200 bps is set as the default requested transmission speed for the wireless LAN communication unit 104, and 200 bps is also set as the default requested transmission speed for the cellular phone 101.

By sending the default content request signal for the road segment 1 to the content transmission device 20, packets storing the content are distributed, at 200 bps, to the respective communication means from the content transmission device 20 over the communication path 40.

After sending the default content request signal, the communication control unit 110 calculates modified requested transmission speeds for the segment 1 of the respective communication means, in order to cope with variations in the communication speed in the communication path 40 (S60).

Figure 17:
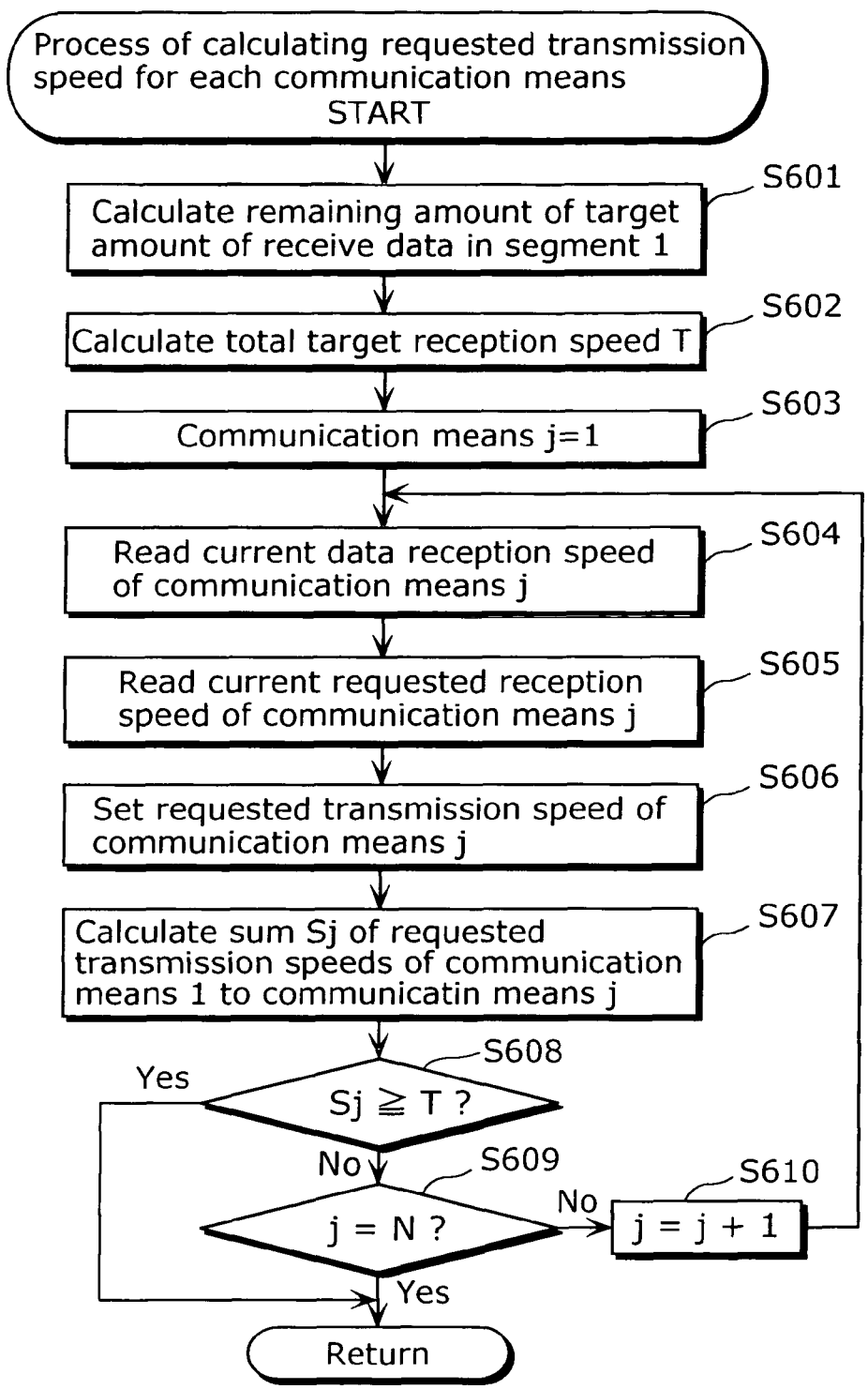
FIG. 17 is a flowchart showing a subroutine of the process of calculating requested transmission speeds (S60) shown in FIG. 8.

FIG. 17 is a flowchart showing a subroutine of the process of calculating requested transmission speeds (S60) shown in FIG. 8.

First, the remaining amount $\Delta$ of the target amount of receive data Do in the segment 1 is calculated (S601).

The initial value of the remaining amount $\Delta$ of the target amount of receive data Do is calculated by using a value S calculated in S40 in FIG. 8 (e.g., 400 Kbytes) and by sequentially subtracting, from such value S, the amount of each data Dx actually received.

$$\Delta = S - Dx$$

Next, as a total target reception speed T from the communication means 1 to the communication means N, a value is determined by dividing the remaining amount $\Delta$, calculated in Step S601, of the target amount of receive data Do by a prediction time t required to pass through the end point of the segment 1 starting from the present position (S602).

$$T = \Delta / t$$

Next, "1" is set to the communication means number j (S603).

Next, the latest data reception speed of the communication means j measured by the transmission/reception speed measurement unit is read out (S604).

Next, the latest requested transmission speed of the communication means j is read out (S605). The initial value of the requested transmission speed is derived based on the value calculated in Step S405 in FIG. 11, after which a value set and recorded in the next step S606 is read out.

Next, the value of a new requested transmission speed of the communication means j is set, based on the actual measured value of the data reception speed read out in Step S604 and the value of the latest requested transmission speed read out in Step S605 (S606).

As the new requested transmission speed, "the latest data reception speed*1.05" is set in the case where the actual measured value of the data reception speed is equal to or greater than "the latest requested transmission speed*0.9", whereas "the latest data reception speed*1.1" is set in the case where the actual measured value of the data reception speed is less than "the latest requested transmission speed*0.9".

Accordingly, it becomes possible to have an improved value as the actual measured value of the data reception speed since the requested transmission speed is modified to a higher value even when the data transmission speed of the communication path 40 is decreased.

Next, the communication control unit 110 calculates a sum Sj of new requested transmission speeds of the communication means 1 to the communication means j (S607). Then, the communication control unit 110 judges whether or not such Sj is equal to or greater than the total requested transmission speed T from the communication means 1 to N (S608).

In the case where Sj is not equal to or greater than T (No in S608), the communication control unit 110 judges whether or not the value of j is the maximum value N (here 2) (S609).

In the case where the result of the judgment is that the value of j is not the maximum value N (No in S609), the communication control unit 110 increments the communication means number j by 1 (S610), and repeatedly performs Steps S604 to S610 until Sj becomes equal to or greater than T or until the value of j becomes the maximum value N.

In the case where the result of the judgment is that Sj is equal to or greater than T (Yes in S608), the communication control unit 110 terminates the process of calculating requested transmission speeds, and returns to the main routine shown in FIG. 8. Also in the case where the communication means number j is the maximum value N (Yes in S609), the communication control unit 110 terminates the process of calculating requested transmission speeds, and returns to the main routine shown in FIG. 8.

After setting the requested transmission speed of each communication means in Step S60, the communication control unit 110 newly generates a content request signal based on such set requested transmission speeds, and sends it to the content transmission device 20 (S70).

Then, the communication control unit 110 repeats the process of calculating requested transmission speeds for each communication means in Step S60 and the process of transmitting a content request signal in Step S70 until the vehicle passes through the end point of the segment 1 (No in S80).

Accordingly, it becomes possible to receive the target amount of receive data Do in the segment 1, even in the case where there occurs variations in the data reception speed.

In the case where the content reception is not completed even after the vehicle passes through the end point of the segment 1 (Yes in S80, No in S90), the communication control unit 110 repeats the processes in Steps S30 to S90 until the reception of the content completes (S90).

Accordingly, it becomes possible to receive the target amount of receive data in all the segments even in the case where there occurs variations in the data reception speed, and thus to perform the streaming reproduction of the content at a predetermined bit rate.

Next, a description is given of the operations performed by the content transmission device 20 when receiving a content bit rate obtainment request and a content request signal sent by the content reproduction device 10.

The communication unit 203 sends, to the packetization unit 202, the received content bit rate obtainment request. The packetization unit 202 reads, from the content accumulation unit 201, the bit rate of the content indicated by the identification information 601 included in the content bit rate obtainment request, and sends the read-out bit rate to the content reproduction device 10.

Also, the communication unit 203 sends the received content request signal 60 to the packetization unit 202. The packetization unit 202 reads, from the content accumulation unit 201, the content indicated by the content identification information 601 included in the content request signal 60 at the speed that is based on the requested transmission speed 605 included in the content request signal 60, packetizes such content, and outputs packets together with the IP address 603 and the port number 604 corresponding to the destination communication means. The communication unit 203 attaches the destination address to the packets, and transmits the packets to the content reproduction device 10.

Figure 18:
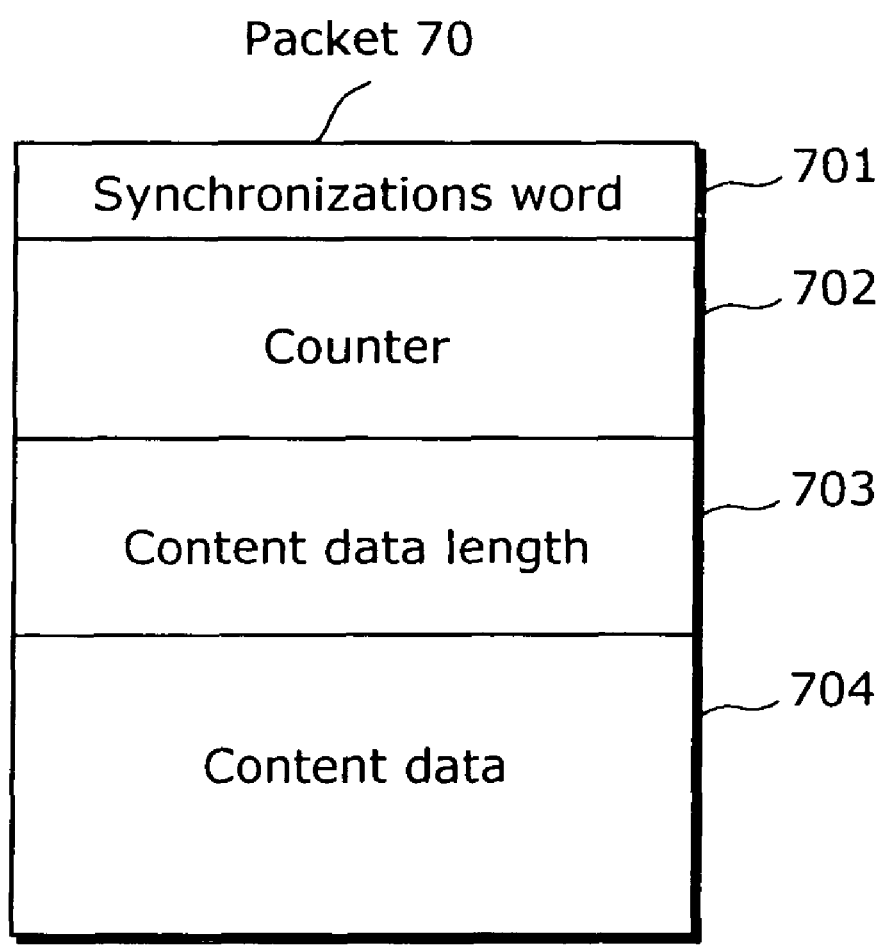
FIG. 18 is a schematic diagram showing the structure of a packet generated by a packetization unit 202.

FIG. 18 is a diagram showing the structure of a packet 70 generated by the packetization unit 202.

As shown in FIG. 18, the packet 70 is made up of a synchronization word 701, a counter 702, a content data length 703, and content data 704.

The synchronization word 701 indicates the top of the packet. The counter 702 is used by the content reproduction device 10 which has received packets 70 to reconstruct the packets 70. Starting with the value "0", the counter 702 increments the value by 1 every time content data is read out and packetized, and starts again from "0" when the value reaches the maximum value. The content data length 703 indicates the data length of the content data stored in such packet 70.

Next, a description is given of the operation performed by the content reproduction device 10 when receiving the packets transmitted by the content transmission device 20.

Each packet 70 received by the cellular phone 101 is accumulated into the buffer 1130 of the content reconstruction unit 113 after transmitted to the cellular phone IF unit 102. Similarly, each packet 70 received by the wireless LAN communication unit 104 is accumulated into the buffer 1130 of the content reconstruction unit 113. The content reconstruction unit 113 reads the packets 70 accumulated in the buffer 1130 in order of values indicated by their respective counters, and sends the content data 704 of the packets 70 to the reproduction unit 114. The reproduction unit 114 reproduces the content.

Figure 19:
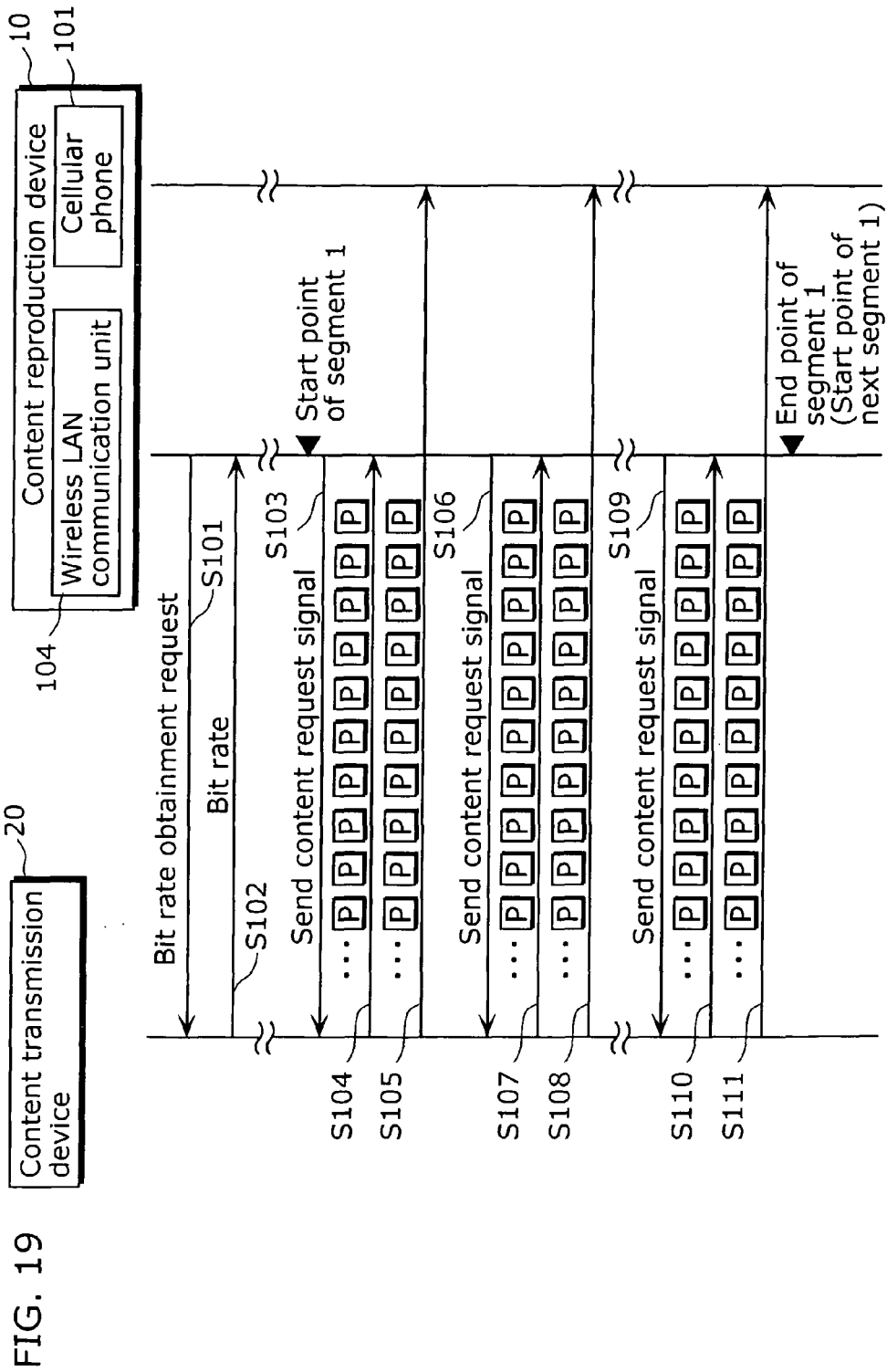
FIG. 19 is a diagram showing a sequence performed between the content reproduction device 10 and the content transmission device 20 when obtaining a content.

Here, referring to FIG. 19, a description is given of the summary of the points of the communication sequence to be performed when the content reproduction device 10 obtains a content from the content transmission device 20 in the content transmission/reception system 1 in the first embodiment.

FIG. 19 is a diagram showing a sequence performed between the content reproduction device 10 and the content transmission device 20 when obtaining a content.

Upon receipt of a request for content reproduction, the communication control unit 110 of the content reproduction device 10 generates a content bit rate obtainment request, and sends a generated content bit rate obtainment request to the content transmission device 20 via the wireless LAN communication unit 104 (S101).

Upon receipt of the content bit rate obtainment request via the communication unit 203, the packetization unit 202 of the content transmission device 20 obtains the bit rate of the content from the content accumulation unit 201, and sends the obtained bit rate to the wireless LAN communication unit 104 via the communication unit 203 (S102).

Upon obtainment of the bit rate via the wireless LAN communication unit 104, the communication control unit 110 of the content reproduction device 10 performs the above-described process of determining the use order (S30) and process of calculating the target amounts of receive data (S40) so as to generate a default content request signal for the segment 1, and sends the generated content request signal to the content transmission device 20 via the wireless LAN communication unit 104 (S103). Note that the present description is given on the assumption that the requested transmission speeds set in this content request signal are 200 Kbps for both the wireless LAN communication unit 104 and the cellular phone 101.

Upon receipt of the content request signal via the communication unit 203, the packetization unit 202 of the content transmission device 20 reads the content from the content accumulation unit 201 at the bit rate of 400 Kbps, segments it into packets each of which is equivalent to 200 Kbps, attaches the IP address of the wireless LAN communication unit 104 to one of the segmented packet, attaches the IP address of the cellular phone 101 to the other of the segmented packet, and transmits such packets respectively to the wireless LAN communication unit 104 and the cellular phone 101 via the communication unit 203 (S104 and S105).

The content reconstruction unit 113 of the content reproduction device 10 reconstructs the packets received via the wireless LAN communication unit 104 and the cellular phone 101, and the reproduction unit 114 reproduces the reconstructed content. Meanwhile, the communication control unit 110 performs the process of calculating requested transmission speeds (S60) based on the target transmission speeds in Step S103 and the data transmission speeds measured by the transmission speed measurement units 103 and 105, generates a new content request signal, and sends the generated content request signal to the content transmission device 20 via the wireless LAN communication unit 104 (S106).

Upon receipt of the content request signal via the communication unit 203, the packetization unit 202 of the content transmission device 20 reads content data from the content accumulation unit 201 at the bit rate according to the new content request signal, segments the content according to the content request signal, attaches the IP address of the wireless LAN communication unit 104 to one of the segmented packet, attaches the IP address of the cellular phone 101 to the other of the segmented packet, and transmits such packets respectively to the wireless LAN communication unit 104 and the cellular phone 101 via the communication unit 203 (S107 and S108).

The above processes are repeatedly performed until the end point of the segment 1 is reached (S109, S110, and S111).

According to the above structure, by simultaneously using plural communication means for transmission and reception of a single content and by changing the number of communication means to be used as well as the transmission speed of each communication means based on the current transmission speed of each communication means and on a predicted value of a subsequent transmission speed of each communication means, it is possible to perform the streaming reproduction of the content even in the case where the transmission speed changes due to a change in the position of the vehicle and where the maximum value of the transmission speed of one communication means is less than the rate assigned to the content for streaming.

Note that the first embodiment has been described for the wireless LAN communication unit 104 and the cellular phone 101 as examples of the communication means equipped to the content reproduction device 10, but the present invention is not limited to these communication means. Therefore, the communication means may be other communication means such as dedicated short range communication (DRSC), satellite Internet or the like. Furthermore, the number of communication means equipped to the content reproduction device 10 may be three or more.

Also note that the first embodiment has been described for a content transmission control mode in which the content transmission device 20 transmits content data in a successive manner based on the content request signal 60, but the content reproduction device 10 may send, in a successive manner, content obtainment commands, each including an IP address, a port number, a request data size or the like, and the content transmission device may transmit the content only when it receives such a command. In other words, content data may be transmitted only by the amount that is based on the frequency of requests indicating data amount, instead of requested speeds.

Also note that the first embodiment has been described for the case where the content transmission device 20 and the content reproduction device 10 carry out communications over the Internet, but a communication network other than the Internet may be used, or the content transmission device 20 and the content reproduction device 10 may carry out direct communications.

Also note that the data structure of the content request signal shown in FIG. 16 and the data structure of the packet shown in FIG. 18 are just examples, and therefore the present invention is not limited to these structures.

Also note that the content reproduction device 10 may make a packet retransmission request to the content transmission device 20 in order to avoid a content reception error.

Also note that the equation shown in Step S606 for generating a new requested transmission speed is just an example, and therefore the present invention is not limited to this equation.

Furthermore, the above embodiment has a pull-type construction, thereby the content transmission device 20 distributes a content to the content reproduction device 10 based on the reception of a content request signal, but it may have a push-type construction, thereby the content transmission device forcefully distributes a content to the content reproduction device.

Second Embodiment

Figure 20:
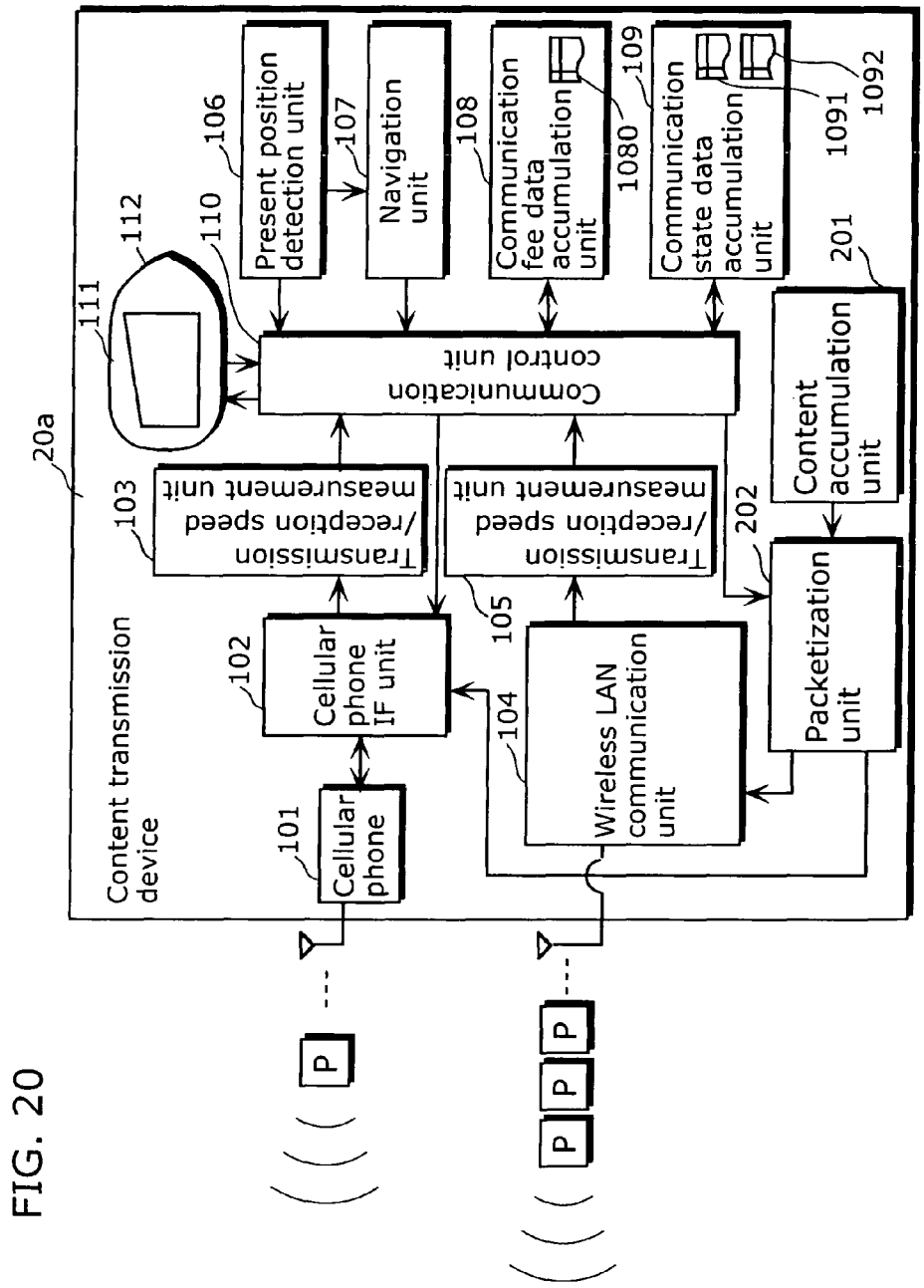
FIG. 20 is a block diagram showing the structure of a content transmission device according to a second embodiment of the present invention.

FIG. 20 is a block diagram showing the structure of a content transmission device 20a according to the second embodiment of the present invention. In FIG. 20, the same constituent elements as those shown in FIG. 3 are assigned the same reference numbers, and descriptions thereof are not given.

The content transmission device 20 is placed in the house in the content transmission/reception system 1, but the present content transmission device 20a is placed on a vehicle and is structured so that it can perform the push distribution of a content to the content reproduction device while the vehicle is moving.

As shown in FIG. 20, in addition to the content accumulation unit 201 and the packetization 202, the content transmission device 20a is comprised of a cellular phone IF unit 102, a wireless LAN communication unit 104, a transmission/reception speed measurement units 103 and 105, a present position detection unit 106, a navigation unit 107, a communication fee data accumulation unit 108, a communication state data accumulation unit 109, and a communication control unit 110.

Figure 21:
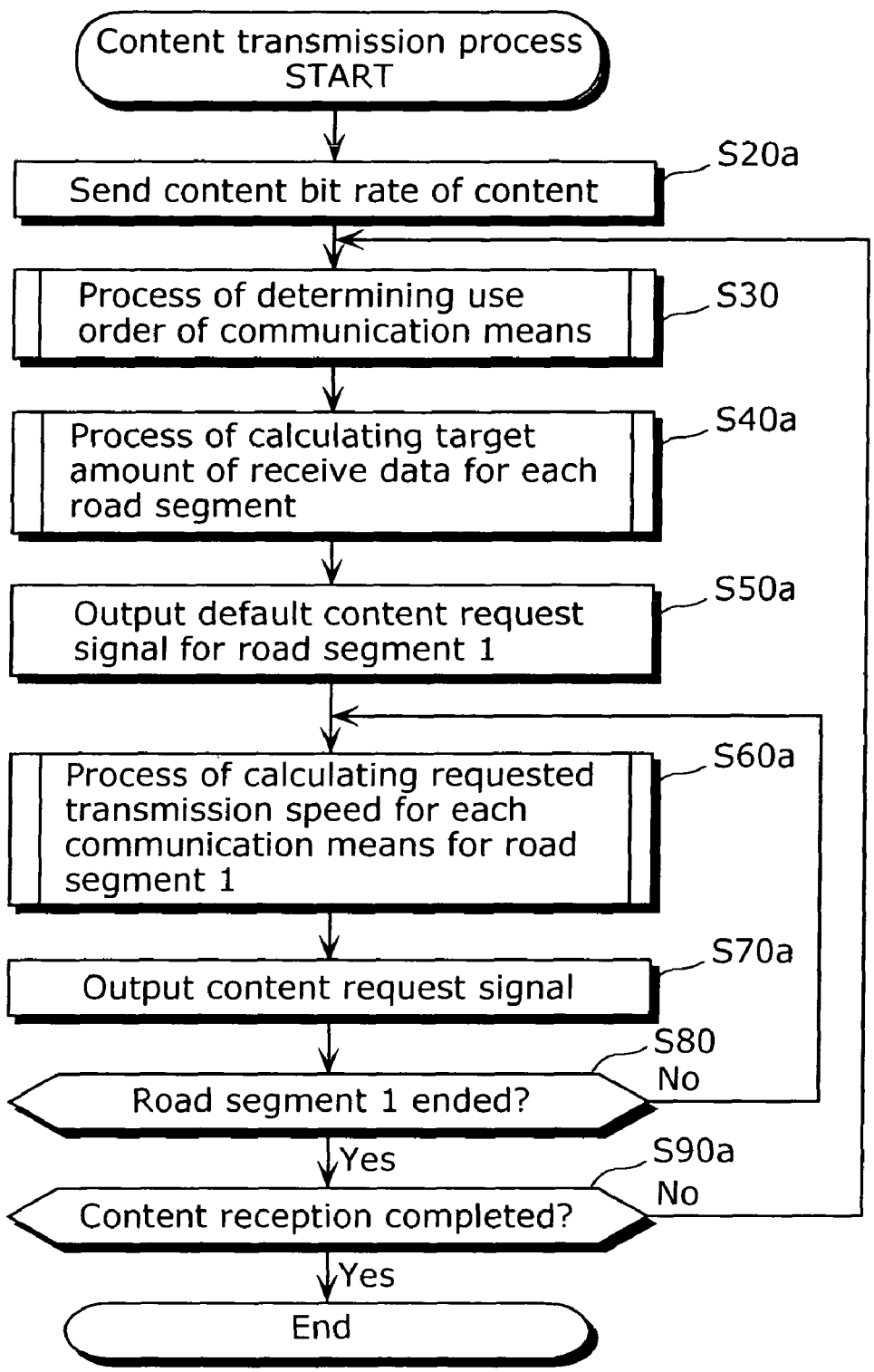
FIG. 21 is a flowchart showing the operation performed by the communication control unit 110 when the content transmission device transmits/receives a content.

Referring to FIG. 21, a description is given of the operation performed by the communication control unit 110 when the content transmission device 20a transmits/receives a content.

The operation performed by the communication control unit 110 of the second embodiment is approximately the same as the operation performed by the communication control unit 110 of the content reproduction device 10 of the first embodiment, and the same steps as those in FIG. 8 are given the same reference numbers in FIG. 21.

Before the content is transmitted, the user inputs communication fees used by the content transmission device 20a.

The communication control unit 110 of the content transmission device 20a first sends the bit rate of the content before transmitting the content (S20a), and determines the order of using plural communication means based on the communication fees for such communication means (S30).

Next, the communication control unit 110 segments a road on which the vehicle is planning to go at every constant driving time, and calculates the target amount of transmission data for each resulting road segment (S40a), generates a default content request signal based on the calculated target amounts of transmission data, and outputs the generated content request signal to the packetization unit 202 (S50a).

Then, the communication control unit 110 calculates a requested transmission speed of each communication means for the segment 1 (S60a). The requested transmission speed is the speed at which the packetization unit 202 of the content transmission device 20a is requested to transmit the content, and a different transmission speed can be set as a requested transmission speed of each communication means.

Next, the communication control unit 110 generates a content request signal based on the requested transmission speeds that have been set, and outputs it to the packetization unit 202 (S70a).

The communication control unit 110 repeats the process of calculating the requested transmission speed for each communication means in Step S60a and the process of outputting a content request signal in Step S70a until the vehicle passes through the end point of the segment 1 (S80). In the case where the transmission of the content is not completed even after the vehicle passes through the end point of the segment 1, the communication control unit 110 returns to Step S30 and repeats the processes until the transmission of the content completes (S90a).

Next, a description is given of the operation performed by the packetization unit 202 when receiving a content request signal outputted by the communication control unit 110.

The packetization unit 202 reads, from the content accumulation unit 201, the content indicated by the content identification information included in the content request signal at the speed that is based on the requested transmission speeds included in the content request signal, packetizes such content, and outputs the packets to either the cellular phone IF unit 102 or the wireless LAN communication unit 104. The cellular phone IF unit 102/the wireless LAN communication unit 104 attaches the destination address to the packets, and transmits the packets.

Note that in the above case, the content reproduction device may have the structure that includes the cellular phone 101, the cellular phone IF unit 102, the wireless LAN communication unit 104, the content reconstruction unit 113, and the reproduction unit 114, or the structure including one communication means, the content reconstruction unit 113, and the reproduction unit 114.

According to the above structure, by simultaneously using plural communication means for transmission and reception of a single content and by changing the number of communication means to be used as well as the transmission speed of each communication means based on the current transmission speed of each communication means and on a predicted value of a subsequent transmission speed of each communication means, it is possible to realize the transmission of a content according to streaming even in the case where the transmission speed changes due to a change in the position of a vehicle and where the maximum value of the transmission speed of one communication means is less than the rate assigned to the content for streaming.

Note that in order to achieve the above object, the content reproduction device according to the present invention is a content reproduction device that performs streaming reproduction of a content, the device including: a plurality of communication units, each receiving a content transmitted in segments from a content transmission device over a communication path; a content reconstruction unit that has a buffer in which each segmented data of the content received by each of the communication units is temporarily accumulated, and that reconstructs each segmented data accumulated in the buffer into the content; a reproduction unit that extracts the content from the buffer at a predetermined bit rate and reproduces the content at the predetermined bit rate, the content having been reconstructed by the content reconstruction unit; and a communication control unit that: calculates, for every predetermined time, target transmission speeds to be assigned for content reception performed by the respective communication units, based on free space in the buffer and the bit rate; and transmits a first request signal indicating the calculated target transmission speeds to the content transmission device via one of the communication units.

Also, the content transmission device according to the present invention is a content transmission device that transmits a content over a communication path, the device including: a content accumulation unit that accumulates a content; a communication unit that communicates, over the communication path, with a content reproduction device that includes a plurality of communication units with different addresses; and a content segmentation unit that: determines amounts of content data to be transmitted based on target transmission speeds of the respective addresses every time a first request signal indicating target transmission speeds of the respective addresses is received, the amounts of content data to be transmitted being determined for the respective addresses; segments the content accumulated in the content accumulation unit; and transmits each segmented data of the content addressed to each of the addresses via the communication unit.

Furthermore, the content transmission device according to the present invention is a content transmission device that transmits a content over a communication path, the device including: a plurality of communication units; a content accumulation unit that accumulates the content; a transmission speed measurement unit that measures data transmission speeds of the respective communication units; a communication control unit that assigns target transmission speeds to the respective communication units based on the data transmission speeds measured by the transmission speed measurement unit; and a content segmentation unit that segments the content based on the target transmission speeds, and transmits the segmented data of the content via the communication units.

Furthermore, the content reproduction device according to the present invention may further include a communication fee storage unit which stores, in advance, communication fees of the respective communication units, wherein the communication control unit determines the target transmission speeds of the respective communication units based on the communication fees.

Furthermore, the content transmission device according to the present invention may further include: a present position detection unit that detects a present position and outputs present position information; a traveling route storage unit that stores information on planned transit positions; and a reception state storage unit which stores data reception speeds of the respective communication units at each position indicated in the position information, wherein the communication control unit determines the target transmission speeds of the respective communication units based on the data reception speeds of the respective communication units at a position indicated by the information on planned transit positions after the present position, the data reception speeds being stored in the reception state storage unit.

Note that it is possible to embody the present invention not only as the above-described content transmission device and content reproduction device, but also as a content transmission method and a content reproduction method that include, as their respective steps, the characteristic constituent elements included in such content transmission device and content reproduction device, as well as programs causing a computer to execute such steps. It should be also noted that such programs can be distributed on a recording medium such as CD-ROM and over a transmission medium such as the Internet.

INDUSTRIAL APPLICABILITY

The content transmission device and the content reproduction device according to the present invention are applicable to audio-video equipment, car navigation system, computer, and the like.

The invention claimed is:

1. A content reproduction device that performs streaming reproduction of a content, the device comprising:
    a plurality of communication units that receive, in parallel, segmented data of a content, the content being a same content, transmitted from a content transmission device over a communication path, a part of the segmented data of the content being received by one of the plurality of communication units and another part of the segmented data of the content being received by another one of the plurality of communication units, the segmented data having data amounts adjusted based on a transmission speed which enables communication;
    a content reconstruction unit having a buffer in which the segmented data received by the plurality of communication units is temporarily accumulated, and that reconstructs the segmented data accumulated in the buffer into the content;
    a reproduction unit that extracts the content from the buffer at a predetermined bit rate and that reproduces the content at the predetermined bit rate, the content having been reconstructed by the content reconstruction unit;
    a communication fee storage unit which stores, in advance, communication fees of the plurality of communication units; and
    a communication control unit that:
        calculates, for every predetermined time, target transmission speeds to be assigned for content reception by causing the target transmission speeds to associate respectively with the plurality of communication units, based on free space in the buffer and the bit rate; and
        transmits a first request signal indicating the calculated target transmission speeds corresponding to the plurality of communication units to the content transmission device via one of the plurality of communication units,
    wherein the segmented data includes counters indicating an order of the segmentation performed by the content transmission device, and the content reconstruction unit reconstructs the content by extracting the segmented data accumulated in the buffer in the order of values indicated by respective counters,
    wherein the content transmission device transmits the segmented data of the content to be received, in parallel, by the plurality of communication units at a transmission speed adjusted based on the first request signal, and the plurality of communication units receive, in parallel, the segmented data of the content transmitted from the content transmission device at the transmission speed adjusted by the content transmission device based on the first request signal,
    wherein the communication control unit determines the target transmission speeds of the plurality of communication units based on the communication fees, and
    wherein the streaming reproduction is achievable even when the transmission speed of one communication unit is less than a transmission speed assigned to the content for streaming.

2. The content reproduction device according to claim 1, wherein the first request signal indicates addresses for the plurality of communication units.

3. The content reproduction device according to claim 1, wherein the first request signal is a content obtainment command indicating addresses for the plurality of communication units.

4. The content reproduction device according to claim 1, further comprising:
    a present position detection unit that detects a present position;
    a traveling route obtainment unit that obtains a traveling route starting from the present position detected by the present position detection unit; and
    a reception state storage unit which stores, in advance, data reception speeds of the plurality of communication units at each position on the traveling route obtained by the traveling route obtainment unit,
    wherein the communication control unit determines the target transmission speeds of the plurality of communication units based on free space in the buffer and the data reception speeds of the plurality of communication units at a position indicated by information on a planned transit position after the present position, the data reception speeds being stored in the reception state storage unit.

5. The content reproduction device according to claim 4, further comprising:
    a reception speed measurement unit that measures data reception speeds of the plurality of communication units,
    wherein the communication control unit:
    calculates modified target transmission speeds, each being calculated based on a difference between the target transmission speed assigned for the content reception of each of the plurality of communication units and each of the data reception speeds measured by the reception speed measurement unit; and
    transmits a second request signal indicating the calculated target transmission speeds to the content transmission device via one of the plurality of communication units.

6. A content transmission device that transmits a content over a communication path, the device comprising:
    a content accumulation unit that accumulates a content, the content being a same content;
    a communication unit that communicates, over the communication path, with a content reproduction device that includes a plurality of communication units with different addresses;
    a communication fee storage unit which stores, in advance, communication fees of the plurality of communication units; and
    a content segmentation unit that:
    determines amounts of content data to be transmitted based on target transmission speeds of the respective addresses every time a first request signal indicating target transmission speeds of the respective addresses is received, the amounts of content data to be transmitted being determined for the respective addresses;
    segments the content accumulated in the content accumulation unit into segmented data, the segmented data having data amounts adjusted based on a transmission speed which enables communication; and transmits the segmented data of the content addressed to the addresses via the communication unit such that a part of the segmented data of the content is received by one of the plurality of communication units and another part of the segmented data of the content is received by another one of the plurality of communication units, and the segmented data includes counters indicating an order of the segmentation performed, wherein the plurality of communication units receive a part of the segmented data of the content obtained by segmenting data of a single content, and the plurality of communication units reconstruct the segmented data based on the order indicated by a respective counter, and wherein the content segmentation unit transmits the segmented data of the content to be received, in parallel, by the plurality of communication units at a transmission speed adjusted based on the first request signal, and the plurality of communication units receive, in parallel, the segmented data of the content transmitted from the content segmentation unit at the transmission speed adjusted by the content segmentation unit based on the first request signal, wherein the content segmentation unit determines the target transmission speeds of the plurality of communication units based on the communication fees, and wherein the streaming reproduction is achievable even when the transmission speed of one communication unit is less than a transmission speed assigned to the content for streaming.

7. A content reproduction method for performing streaming reproduction of a content, the method comprising:

a plurality of communication steps in each of which segmented data of a content, the content being a same content, transmitted from a content transmission device over a communication path are received, in parallel, by a plurality of communication units, a part of the segmented data of the content being received by one of the plurality of communication units and another part of the segmented data of the content being received by another one of the plurality of communication units, the segmented data having data amounts adjusted based on a transmission speed which enables communication;

a content reconstruction step of temporarily accumulating, in a buffer, the segmented data received in the plurality of communication steps, and reconstructing the segmented data accumulated in the buffer into the content;

a reproduction step of extracting the content from the buffer at a predetermined bit rate and reproducing the content at the predetermined bit rate, the content having been reconstructed in the content reconstruction step;

a storage step of storing, in advance, communication fees of the plurality of communication units;

a communication control step of:

calculating, for every predetermined time, target transmission speeds to be assigned for content reception by causing the target transmission speeds to associate respectively with the plurality of communication steps, based on free space in the buffer and the bit rate; and transmitting a first request signal indicating the calculated target transmission speeds corresponding to the plurality of communication units to the content transmission device using one of the plurality of communication steps, wherein the segmented data includes counters indicating an order of the segmentation performed by the content transmission device, and the content reconstruction step reconstructs the content by extracting the segmented data accumulated in the buffer in the order of values indicated by respective counters, and wherein the content transmission device transmits the segmented data of the content to be received, in parallel, by the plurality of communication units at a transmission speed adjusted based on the first request signal, and the plurality of communication units receives, in parallel, the segmented data of the content transmitted from the content transmission device at the transmission speed adjusted by the content transmission device based on the first request signal, wherein the communication control step determines the target transmission speeds of the plurality of communication units based on the communication fees, and wherein the streaming reproduction is achievable even when the transmission speed of one communication unit is less than a transmission speed assigned to the content for streaming.

8. A content transmission method for transmitting a content over a communication path, the method comprising:

a communication step of communicating, over the communication path, with a content reproduction device that includes a plurality of communication units with different addresses;

a storage step of storing, in advance, communication fees of the plurality of communication units; and a content segmentation step of:

determining amounts of content data to be transmitted based on target transmission speeds of the respective addresses every time a first request signal indicating target transmission speeds of the respective addresses is received, the amounts of content data to be transmitted being determined for the respective addresses;

segmenting the content, the content being a same content, accumulated in a content accumulation unit into segmented data, the segmented data having data amounts adjusted based on a transmission speed which enables communication; and transmitting the segmented data of the content addressed to the addresses using the communication step such that a part of the segmented data of the content is received by one of the plurality of communication units and another part of the segmented data of the content is received by another one of the plurality of communication units, and the segmented data includes counters indicating an order of the segmentation performed, wherein the plurality of communication units receive a part of the segmented data of the content obtained by segmenting data of a single content, and the plurality of communication units reconstruct the segmented data based on the order indicated by the counter, and wherein the content segmentation step transmits the segmented data of the content to be received, in parallel, by the plurality of communication units at a transmission speed adjusted based on the first request signal, and the plurality of communication units receive, in parallel, the segmented data of the content transmitted during the content segmentation step at the transmission speed adjusted by the content segmentation step based on the first request signal, wherein the content segmentation step determines the target transmission speeds of the plurality of communication units based on the communication fees, and wherein the streaming reproduction is achievable even when the transmission speed of one communication unit is less than a transmission speed assigned to the content for streaming.

9. A program stored on a non-transitory computer-readable recording medium for a content reproduction device that performs streaming reproduction of a content, the program causing a computer to execute the steps included in the content reproduction method according to claim 7.

10. A program stored on a non-transitory computer-readable recording medium for a content transmission device that transmits a content over a communication path, the program causing a computer to execute the steps included in the content transmission method according to claim 8.

11. A content reproduction device that performs streaming reproduction of a content, the device comprising:
a plurality of communication units that receive, in parallel, segmented data of a content, the content being a same content, transmitted from a content transmission device over a communication path, a part of the segmented data of the content being received by one of the plurality of communication units and another part of the segmented data of the content being received by another one of the plurality of communication units, the segmented data having data amounts adjusted based on a transmission speed which enables communication;
a content reconstruction unit having a buffer in which the segmented data received by the plurality of communication units is temporarily accumulated, and that reconstructs the segmented data accumulated in the buffer into the content;
a reproduction unit that extracts the content from the buffer at a predetermined bit rate and that reproduces the content at the predetermined bit rate, the content having been reconstructed by the content reconstruction unit;
a communication fee accumulation unit that accumulates, in advance, communication fees of the respective communication units; and
a communication control unit that:
determines a use order of the plurality of communication units based on the communication fees accumulated in the communication fee accumulation unit,
calculates, for every predetermined time, target transmission speeds to be assigned for content reception by causing the target transmission speeds to associate respectively with the plurality of communication units, based on the determined use order, free space in the buffer and the bit rate; and
transmits a first request signal indicating the calculated target transmission speeds corresponding to the plurality of communication units to the content transmission device via one of the plurality of communication units, and
wherein the content transmission device transmits the segmented data of the content to be received, in parallel, by the plurality of communication units at a transmission speed adjusted based on the first request signal, and the plurality of communication units receive, in parallel, the segmented data of the content transmitted from the content transmission device at the transmission speed adjusted by the content transmission device based on the first request signal, and
wherein the streaming reproduction is achievable even when the transmission speed of one communication unit is less than a transmission speed assigned to the content.

12. The content reproduction device according to claim 11, wherein the segmented data includes counters indicating an order of the segmentation performed by the content transmission device, and
the content reconstruction unit reconstructs the content by extracting the segmented data accumulated in the buffer in order of values indicated by respective counters.

13. The content reproduction device according to claim 11, wherein the first request signal indicates addresses for the respective communication units.

14. The content reproduction device according to claim 11, wherein the first request signal is a content obtainment command indicating addresses for the respective communication units.

15. The content reproduction device according to claim 14, further comprising:
a present position detection unit that detects a present position;
a traveling route obtainment unit that obtains a traveling route starting from the present position detected by the present position detection unit; and
a reception state storage unit which stores, in advance, data reception speeds of the respective communication units at each position on the traveling route obtained by the traveling route obtainment unit,
wherein the communication control unit determines the target transmission speeds of the respective communication units based on free space in the buffer and the data reception speeds of the respective communication units at a position indicated by information on a planned transit position after the present position, the data reception speeds being stored in the reception state storage unit.

16. The content reproduction device according to claim 15, further comprising:
a reception speed measurement unit that measures data reception speeds of the plurality of communication units,
wherein the communication control unit:
calculates modified target transmission speeds, each being calculated based on a difference between the target transmission speed assigned for the content reception of each of the communication units and each of the data reception speeds measured by the reception speed measurement unit; and
transmits a second request signal indicating the calculated target transmission speeds to the content transmission device via one of the communication units.

* * * * *